(12) United States Patent
Hirano et al.

(10) Patent No.: US 6,459,005 B1
(45) Date of Patent: Oct. 1, 2002

(54) ETHYLENE/α-OLEFIN COPOLYMER, METHOD FOR PRODUCING THE SAME, AND USE THEREOF

(75) Inventors: Hideki Hirano, Ichihara; Terunori Fujita, Yamaguchi; Junji Saito, Yamaguchi; Makoto Mitani, Yamaguchi, all of (JP)

(73) Assignee: Mutsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/545,672

(22) Filed: Apr. 7, 2000

(30) Foreign Application Priority Data

Apr. 9, 1999 (JP) ............................. 11-102845
Apr. 3, 2000 (JP) ........................... 2000-105406

(51) Int. Cl.$^7$ ..................... C10M 143/02; C08F 210/16
(52) U.S. Cl. ................. 585/12; 585/512; 585/523; 585/525; 585/526; 585/527; 525/246; 525/249
(58) Field of Search ................. 585/12, 512, 523, 585/525, 526, 527

(56) References Cited

U.S. PATENT DOCUMENTS

| | | | |
|---|---|---|---|
| 4,704,491 A | * 11/1987 | Tsutsui et al. ............... 585/10 |
| 5,321,206 A | 6/1994 | LaPointe | |
| 5,498,809 A | 3/1996 | Emert et al. | |
| 5,663,130 A | 9/1997 | Emert et al. | |
| 5,767,331 A | 6/1998 | Oda et al. | |
| 5,883,202 A | 3/1999 | Ewen et al. | |
| 5,955,639 A | 9/1999 | Oda et al. | |

FOREIGN PATENT DOCUMENTS

| | | |
|---|---|---|
| EP | 0200351 A2 | 3/1986 |
| EP | 0223394 A1 | 10/1986 |
| EP | 0200351 | 11/1986 |
| EP | 0360492 A2 | 9/1989 |
| EP | 0426637 A2 | 10/1990 |
| EP | 0426638 A2 | 10/1990 |
| EP | 0573403 A2 | 6/1993 |
| EP | 0874005 | 10/1998 |
| EP | 0953571 A1 * | 3/1999 |
| EP | 1013674 A1 * | 6/2000 |
| EP | 1 057 867 | 12/2000 |
| JP | 62119215 A | 5/1987 |
| JP | 09188713 A | 7/1997 |
| WO | 9001503 | 2/1990 |
| WO | WO9313140 | 7/1993 |
| WO | WO9514044 | 5/1995 |

* cited by examiner

Primary Examiner—Jacqueline V. Howard
(74) Attorney, Agent, or Firm—Birch, Stewart, Kolasch & Birch, LLP

(57) ABSTRACT

The present invention intends to provide an ethylene/α-olefin copolymer of specific structure, exhibiting excellent performance as a lubricant oil additive, capable of having various functional groups in high ratio, and serviceable as raw material for various solubilizing agents. The ethylene/α-olefin copolymer of the present invention is composed of ethylene and an α-olefin having 3 to 10 carbon atoms, and characterized by specific characteristics.

6 Claims, No Drawings

ETHYLENE/α-OLEFIN COPOLYMER, METHOD FOR PRODUCING THE SAME, AND USE THEREOF

TECHNICAL FIELD OF THE INVENTION

The present invention relates to a novel ethylene/α-olefin copolymer, method for producing the same, and its use.

More particularly, the present invention relates to an ethylene/α-olefin copolymer having an unsaturated bond, such as vinyl or vinylidene type, at the molecular terminal at a ratio of 95% or more, specific molecular weight and composition, and method for producing the same and its use.

PRIOR ART

Lubricant oils, such as gear and engine oils, are known to comprise a mineral oil or synthetic oil, such as poly-α-olefin and low-molecular-weight ethylene/α-olefin copolymer. It is also known that these lubricant oils are incorporated with a viscosity index improver, such as ethylene/α-olefin copolymer and polymethacrylate, to improve their viscosity/temperature characteristics. These lubricant oil compositions are required to exhibit good viscosity characteristics (in particular, low-temperature fluidity), and shear, heat and oxidation stability.

Lubricant oils, such as engine oil, gear oil, grease and metal machining oil, are also incorporated with a variety of other additives, to improve their functions. Many of these additives are polar compounds, which have low affinity for non-polar base oils. Therefore, they are frequently sparingly soluble in base oils, which tends to cause problems, such as limitations on their dose rates or decreased effects. Recently, these problems have been more noted, since mineral oils as the base oils are replaced by synthetic oil of lower polarity to satisfy the severer requirements of lubricant oils. As a result, a solubilizing agent has been in demand to increase solubility of these polar additives in non-polar base oils.

In the plastic industry, it is a common practice to incorporate a synthetic lubricant oil (e.g., ethylene/α-olefin copolymer or α-olefin oligomer) in resins, in order to improve their friction/αabrasion characteristics (sliding characteristics). These resins used in this case, however, are normally polar ones, such as polyacetal, polyamide and polyester. Therefore, the above-mentioned non-polar synthetic lubricants are not well compatible with these resins, possibly causing problems, e.g., deteriorated strength and surface exfoliation, when they are used. A solubilizing agent, therefore, has been strongly demanded to improve dispersibility of a non-polar lubricant oil in a polar resin.

An ethylene/α-olefin copolymer for the above lubricant oil or additive has been produced in the presence of a vanadium-based catalyst composed of a vanadium compound and organoaluminum compound, as disclosed by Japanese Patent Publication Nos. 1163/1990 and 7998/1990. However, the vanadium-based catalyst is insufficient in polymerization activity.

It is known that the copolymer can be produced in the presence of a catalyst of high polymerization activity, which is composed of a metallocene compound (e.g., zirconocene) and organoaluminumoxy compound (aluminoxane), as disclosed by Japanese Patent Laid-Open No. 221207/1986 and Japanese Patent Publication No. 121969/1995. The ethylene/α-olefin copolymer produced by the methods of prior literature is characterized by having an unsaturated bond at the molecular terminal and easily modified to introduce a functional group. However, production of such a copolymer sufficiently low in molecular weight to be liquid needs a large quantity of hydrogen as the molecular weight modifier, which causes various problems, e.g., decreased polymerization yield and massive disappearance of the unsaturated bonds at the molecular terminals by hydrogenation, which serve as the active sites for the modification reactions.

OBJECTS OF THE INVENTION

It is an object of the present invention to provide an ethylene/α-olefin copolymer of specific structure, exhibiting excellent performance as a lubricant oil additive, capable of having various functional groups in high yield, and applicable as raw material for various solubilizing agents. It is another object of the present invention to provide a method for producing the above copolymer. It is still another object of the present invention to provide use of the above copolymer.

SUMMARY OF THE INVENTION

The present invention provides a novel ethylene/α-olefin copolymer effectively solving the above problems, a method of producing the same, and use of the same.

That is, the present invention provides a novel ethylene/α-olefin copolymer characterized by:

(1) comprising ethylene unit of 30 to 80% by mol and α-olefin having 3 to 10 carbon atoms of 20 to 70% by mol;

(2) having a number-average molecular weight (Mn) of 500 to 12,000, determined by gel permeation chromatography (GPC) and molecular weight distribution (Mw/Mn) of 3 or less;

(3) having a kinetic viscosity at 100° C. of 10 to 5,000 mm$^2$/s;

(4) that at least 95% of whole polymer chains have at least one unsaturated bond at molecular terminal thereof; and (5) having a B value, given by the following formula (I), of 1.0 to 2.0:

$$B = P_{OE}/(2P \cdot P_E) \qquad (I)$$

wherein, $P_E$ is molar fraction of the ethylene unit in the copolymer, $P_O$ is molar fraction of the α-olefin unit in the copolymer, and $P_{OE}$ is proportion of number of α-olefin/ethylene sequences to number of all the dyad sequences.

The ethylene/α-olefin according to the present invention can be obtained by copolymerizing ethylene and α-olefin of 3–10 carbon atoms using an olefin polymerization catalyst comprising:

(A) a transition metal compound represented the following formula (II) and (B) at least one compound selected from the group consisting of:

(B-1) an organometallic compound, (B-2) an organoaluminum oxy-compound, and (B-3) a compound reacting with the transition metal compound (A) to form an ion pair

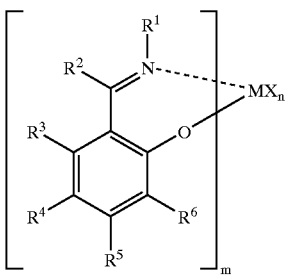

(II)

wherein M is a transition metal atom selected from Group 3 to 11 of the periodic table;

m is an integer of 1–6;

$R^1$ to $R^6$ may be the same as or different from each other, and is a hydrogen atom, a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group, with the proviso that two or more of these may be bonded to each other to form a ring, and when m is 2 or more, any two of groups represented by $R^1$ to $R^6$ may be bonded;

n is a number satisfying a valence of M;

X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, with the proviso that when n is 2 or more, plural groups represented by X may be the same as or different from each other, and plural groups represented by X may be bonded to each other to form a ring.

The ethylene/α-olefin copolymer according to the invention can be used as lubricant base oil excellent in temperature/viscosity property, shear stability, heat-resistance/oxidative stability. Further, the ethylene/α-olefin copolymer can be used as a viscosity index improver excellent in temperature/viscosity property and shear stability by adding to other base oil, such as a mineral oil or an α-olefin oligomer.

The ethylene/α-olefin copolymer has features in that 95% or more of whole polymer chain has at least one unsaturated bond at a molecular terminal having a reactivity, so that various kinds of functional groups can be easily introduced, and, hence, it is easy to modify to a functional ethylene/α-olefin copolymer such as a polar additive or a solubilizing agent with a polar resin.

In order to obtain the modified ethylene/α-olefin copolymer of the present invention, the above mentioned unsaturated bond at a molecular terminal in the ethylene/α-olefin copolymer is modified by any one group selected from a carboxyl group, an acid anhydride group, an ester group, an epoxy group, a hydroxyl group, a diol group, an amino group and a phenyl group, or a gas containing molecular oxygen (a molecular oxygen-containing gas) and/or an ozone-containing gas.

The lubricant oil composition of the present invention contains the above mentioned ethylene/α-olefin copolymer as a base oil or a viscosity index improver. And further, the lubricant oil composition of the present invention contains the above mentioned modified ethylene/α-olefin copolymer as a detergent-dispersant.

The resin composition of this present invention contains the above modified ethylene/α-olefin copolymer as a modifier which modifies a resin selected from the group consisting of an epoxy resin, an urethane resin, a polyacetal resin, a polyester resin and urea resin.

Mode for Carrying out the Invention

The ethylene/α-olefin copolymer, the methods for preparing the same and the uses thereof according to the present invention are explained below in more detail.

Ethylene/α-olefin Copolymer

The ethylene/α-olefin copolymer of the present invention comprises ethylene and an α-olefin of 3–10 carbon atoms. Examples of an α-olefin of 3–10 carbon atoms used in the invention include propylene, 1-butene, 1-pentene, 3-methyl-1-butene, 1-hexene, 4-methyl-1-pentene, 3-methyl-1-pentene, 1-octene, 1-decene and the like, and one or more of them are used. Of these, propylene is particularly preferable.

The ethylene/α-olefin copolymer of the present invention contains, as constituent units, an ethylene unit of 30–80% by mol, preferably of 35–75% by mol, particularly preferably of 40–70% by mol and an α-olefin unit of 20–70% by mol, preferably of 25–65% by mol, particularly preferably of 30–60% by mol. The ethylene/α-olefin copolymer contains each of the units within the above ranges, so that it is capable of exhibiting an excellent temperature/viscosity property as a lubricant base oil or a viscosity index improver.

The number average molecular weight (Mn) and molecular weight distribution (Mw/Mn) of the ethylene/α-olefin of the present invention can be determined by Gel permeation chromatography (GPC) using a monodisperse polystyrene as a standard. The number average molecular weight (Mn) of the ethylene/α-olefin copolymer measured in this method is in the range of 500 to 12,000, preferably 600 to 11,000, particularly preferably 700 to 10,000. Further, the molecular weight distribution (Mw/Mn) of the ethylene/α-olefin copolymer is 3 or less, preferably 2.7 or less, particularly preferably 2.5 or less.

The kinetic viscosity at 100° C. of the ethylene/α-olefin copolymer of the invention is 10 to 5,000 mm$^2$/s, preferably 15 to 4,000 mm$^2$/s, more preferably 20 to 3,000 mm$^2$/s.

The ethylene/α-olefin copolymer has each of the molecular weight, molecular weight distribution and kinetic viscosity at 100° C. within the above ranges, so that it exhibits a good temperature/viscosity property and a shear stability.

In the ethylene/α-olefin copolymer of the present invention, the proportion of the polymer chain having an unsaturated bond at a molecular terminal comprising a terminal vinyl group or a terminal vinylidene group is 95% or more, preferably 97% or more, and more particularly 99% or more. Further, it is preferred that the proportion of the polymer chain having an unsaturated bond at a molecular terminal does not change depending on the molecular weight and is the same all over the entire molecular weight range. The proportion of the polymer chain having an unsaturated bond at a molecular terminal can be measured by an infrared spectroscopic analysis (IR), titration, $^{13}$C-NMR and the like.

Next, the methylene chain in the ethylene/α-olefin copolymer of the present invention is explained.

The ethylene/α-olefin copolymer prepared by a conventionally known method has the following structure (i). More specifically, the α-olefin is randomly copolymerized with ethylene with a high position-regularity. For example, the polymerization always proceeds with 1,2-insertion, therefore, the number n of methylene chains (($CH_2)_n$) between adjacent side chains R in the polymer chain becomes an odd number, such as n=1, 3, 5 . . . , and a sequence having methylene chains of n=2 between Rs does not exist.

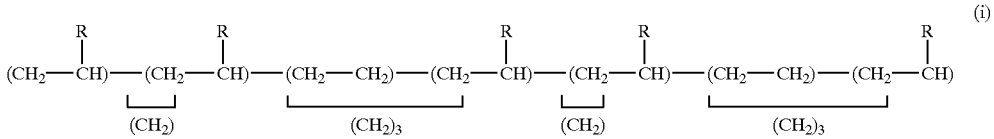

On the other hand, the ethylene/α-olefin copolymer of the present invention has α-olefin units (A) and (D) inserted with a position-irregularity (such as 2,1-insertion followed by 1,2-insertion), therefore, it has the following structure (ii), for example, having a chain $(CH_2)_2$ wherein the number n of methylene chains between adjacent side chains R in the polymer structure is 2.

catalyst, α-olefin is 2,1-inserted with good position-regularity, therefore, like the former case, the —$(CH_2)_2$— chain is not observed in the obtained polymer.

Further, the ethylene/α-olefin copolymer of the present invention has a B value represented by the following formula (I) of 1.0–2.0;

$$B = P_{OE}/(2P_O \cdot P_E) \qquad (I)$$

wherein $P_E$ is a molar fraction of ethylene unit contained in the copolymer, $P_O$ is a molar fraction of α-olefin unit contained in the copolymer, and $P_{OE}$ is a proportion of the α-olefin/ethylene alternating sequences to all the dyad sequences in the copolymer.

As the B value becomes large, the number of block-like sequences becomes smaller, and this means that the distri-

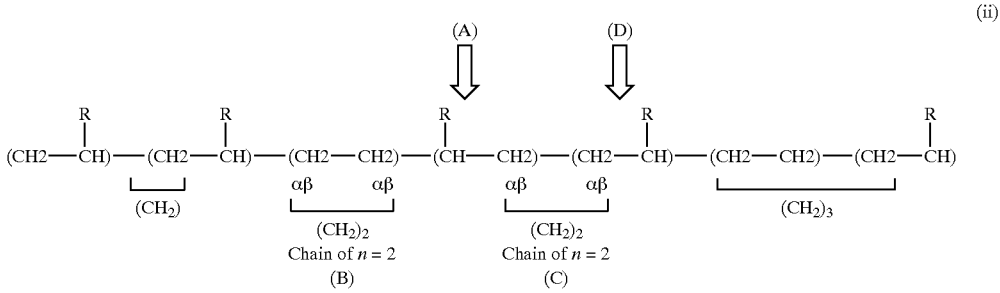

When, after the constituent unit derived from α-olefin is inserted and then ethylene is inserted, the constituent unit (A) derived from an α-olefin is 2,1-inserted, the sequence of n 2 chain (B) originated from the constituent unit derived from the inserted ethylene, that is, —$(CH_2)_2$— chain is observed. When the constituent unit (D) derived from an α-olefin is 1,2-inserted further to the unit (A), the sequence of n=2 chain (C) originated from the constituent unit derived from the adjacent α-olefins (A), (D), i.e., —$(CH_2)_2$— chain is observed.

Namely, the —$(CH_2)_2$— chain is observed when an α-olefin is inserted with position-irregularity. The carbon of this —$(CH_2)_2$— chain is generally referred to as αβ carbon. The specific signal (αβ carbon signal) representing the αβ carbon in $^{13}C$ -NMR spectrum appears a peak in the vicinity 30.5–32.5 ppm.

In the ethylene/α-olefin copolymer of the present invention, the α-olefin is inserted with position-irregularity, therefore, an αβ carbon signal as a specific signal based on a methylene chain between adjacent two tertiary carbons in the main chain of the copolymer is observed in $^{13}C$-NMR spectrum.

It is known that in the ethylene/α-olefin copolymer obtained by using a conventional titanium catalyst and a metallocene catalyst, α-olefin is 1,2-inserted with good position-regularity, therefore, such a —$(CH_2)_2$— chain is not observed. Additionally, it is also known that in the ethylene/α-olefin copolymer obtained also by using a vanadium bution of ethylene and the α-olefins is uniform and the composition distribution of the copolymer is narrow.

Producing of the Ethylene/α-olefin Copolymer

The ethylene/α-olefin copolymer according to the present invention can be produced by copolymerizing ethylene and α-olefin of 3–10 carbon atoms in the presence of a catalyst for olefin polymerization, comprises (A) a transition metal compound represented the following formula (II), and (B) at least one compound selected from the group consisting of:

(B-1) an organometallic compound, (B-2) an organoaluminum oxy-compound, and (B-3) a compound reacting with the transition metal compound (A) to form an ion pair.

Each of catalyst components forming the olefin polymerization catalyst is explained.

(A) Transition Metal Compound

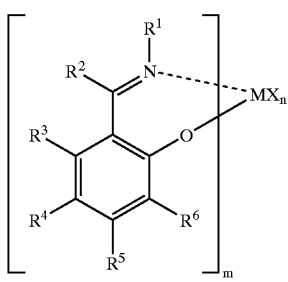

(II)

(Wherein the dotted line ( - - - ) of N - - - M generally means coordinating, however, in the present invention it may not always mean coordinating.)

In the general formula (II), M is a transition metal atom of Group 3 (including lanthanoid) to Group 11 of the periodic table, preferably a transition metal atom of Group 3 (including lanthanoid) to Group 9 of the periodic table, more preferably a transition metal atom of Group 3 to Group 5 and Group 9 of the periodic table, particularly preferably a transition metal atom of Group 4 and Group 5 of the periodic table. Examples of such metal atoms include scandium, titanium, zirconium, hafnium, vanadium, niobium, tantalum, cobalt, rhodium, yttrium, chromium, molybdenum, tungsten, manganese, rhenium, iron and ruthenium. Of these, preferable are scandium, titanium, zirconium, hafnium, vanadium, niobium, tantalum, cobalt, and rhodium, more preferable are titanium, zirconium, hafnium, cobalt, rhodium, vanadium, niobium and tantalum, and particularly preferable are titanium, zirconium and hafnium.

m is an integer of 1–6, preferably an integer of 1–4.

$R^1$ to $R^6$ may be the same as or different from each other, they are each a hydrogen atom, a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group, and two or more of them may be bonded to each other to form a ring.

The halogen atoms include fluorine, chlorine, bromine and iodine.

Examples of the hydrocarbon groups include straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, neopentyl and n-hexyl;

straight-chain or branched alkenyl groups of 2 to 30 carbon atoms, preferably 2 to 20 carbon atoms, such as vinyl, allyl and isopropenyl;

straight-chain or branched alkynyl groups of 2 to 30 carbon atoms, preferably 2 to 20 carbon atoms, such as ethynyl and propargyl;

cyclic saturated hydrocarbon groups of 3 to 30 carbon atoms, preferably 3 to 20 carbon atoms, such as cyclopropyl, cyclobutyl, cyclopentyl, cyclohexyl and adamantyl;

cyclic unsaturated hydrocarbon groups of 5 to 30 carbon atoms, such as cyclopentadienyl, indenyl and fluorenyl;

aryl groups of 6 to 30 carbon atoms, preferably 6 to 20 carbon atoms, such as phenyl, benzyl, naphthyl, biphenyl, terphenyl, phenanthryl and anthracenyl; and alkyl-substituted aryl groups, such as tolyl, isopropylphenyl, t-butylphenyl, dimethylphenyl and di-t-butylphenyl.

In the above hydrocarbon groups, the hydrogen atom may be replaced with a halogen atom, and examples of these halogenated hydrocarbon groups of 1 to 30 carbon atoms, preferably 1 to 20 carbon atoms, include trifluoromethyl, pentafluorophenyl and chlorophenyl.

The above hydrocarbon groups may also be replaced with another hydrocarbon group, and examples of these aryl-substituted alkyl groups include benzyl and cumyl.

Further, the above hydrocarbon groups may have heterocyclic compound residual groups; oxygen-containing groups, such as an alkoxy group, an aryloxy group, an ester group, an ether group, an acyl group, a carboxyl group, a carbonato group, a hydroxyl group, a peroxy group and a carboxylic anhydride group; nitrogen-containing groups, such as an amino group, an imino group, an amido group, an imido group, a hydrazino group, a hydrazono group, a nitro group, a nitroso group, a cyano group, an isocyano group, a cyanato group, an amidino group, a diazo group and ammonium salts derived from an amino group; boron-containing groups, such as a boranediyl group, a boranetriyl group and a diboranyl group; sulfur-containing groups, such as a mercapto group, a thioester group, a dithioester group, an alkylthio group, an arylthio group, a thioacyl group, a thioether group, a thiocyanato group, an isothiocyanato group, a sulfonato ester group, a sulfonamido group, a thiocarboxyl group, a dithiocarboxyl group, a sulfo group, a sulfonyl group, a sulfinyl group and a sulfenyl group; phosphorus-containing groups, such as a phosphido group, a phosphoryl group, a thiophosphoryl group and a phosphate group; silicon-containing groups; germanium-containing groups; or tin-containing groups.

Of the above groups, preferable are straight-chain or branched alkyl groups of 1 to 30 carbon atoms, preferably 1 to 20 carbon atoms, such as methyl, ethyl, n-propyl, isopropyl, n-butyl, isobutyl, sec-butyl, t-butyl, neopentyl and n-hexyl; aryl groups of 6 to 30 carbon atoms, preferably 6 to 20 carbon atoms, such as phenyl, naphthyl, biphenyl, terphenyl, phenanthryl and anthranyl; and substituted aryl groups such as the above aryl groups substituted with 1 to 5 substituents such as halogen atoms, alkyl or alkoxy groups of 1 to 30 carbon atoms, preferably 1 to 20 carbon atoms, and aryl or aryloxy groups of 6 to 30 carbon atoms, preferably 6 to 20 carbon atoms.

Examples of the oxygen-containing groups, nitrogen-containing groups, boron-containing group, sulfur-containing groups and phosphorus-containing groups include those previously described.

Examples of the heterocyclic compound residual groups include residual groups derived from nitrogen-containing compounds (e.g., pyrrole, pyridine, pyrimidine, quinoline and triazine), oxygen-containing compounds (e.g., furan and pyran) and sulfur-containing compounds (e.g., thiophene), and these heterocyclic compound residual groups substituted with substituents such as alkyl or alkoxy groups of 1 to 30 carbon atoms, preferably 1 to 20 carbon atoms.

Examples of the silicon-containing groups include a silyl group, a siloxy group, a hydrocarbon-substituted silyl group and a hydrocarbon-substituted siloxy group. Particular examples of the hydrocarbon-substituted silyl groups include methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl and dimethyl(pentafluorophenyl)silyl. Of these, preferable are methylsilyl, dimethylsilyl, trimethylsilyl, ethylsilyl, diethylsilyl, triethylsilyl, dimethylphenylsilyl and triphenylsilyl. Particularly preferable are trimethylsilyl, triethylsilyl, triphenylsilyl and dimethylphenylsilyl. Particular examples of the hydrocarbon-substituted siloxy groups include trimethylsiloxy.

Examples of the germanium-containing groups and the tin-containing groups include groups wherein silicon is replaced with germanium or tin in the above-mentioned silicon-containing groups.

The above examples of the groups indicated by $R^1$ to $R^6$ are more specifically described below.

Of the oxygen-containing groups, examples of the alkoxy groups include methoxy, ethoxy, n-propoxy, isopropoxy, n-butoxy, isobutoxy and tert-butoxy; preferred examples of the aryloxy groups include phenoxy, 2,6-dimethylphenoxy and 2,4,6-trimethylphenoxy; preferred examples of the acyl groups include formyl, acetyl, benzoyl, p-chlorobenzoyl and p-methoxybenzoyl; and preferred examples of the ester groups include acetyloxy, benzoyloxy, methoxycarbonyl, phenoxycarbonyl and p-chlorophenoxycarbonyl.

Of the nitrogen-containing groups, examples of the amido groups include acetamido, N-methylacetamido and N-methylbenzamido; preferred examples of the amino groups include dimethylamino, ethylmethylamino and diphenylamino; preferred examples of the imido groups include acetimido and benzimido; and preferred examples of the imino groups include methylimino, ethylimino, propylimino, butylimino and phenylimino.

Of the sulfur containing groups, examples of the alkylthio groups include methylthio and ethylthio; preferred examples of the arylthio groups include phenylthio, methylphenylthio and naphthylthio; preferred examples of the thioester groups include acetylthio, benzoylthio, methylthiocarbonyl and phenylthiocarbonyl; preferred examples of sulfonato ester groups include methylsulfonato, ethylsulfonato and phenylsulfonato; and preferred examples of the sulfonamido groups include phenylsulfonamido, N-methylsulfonamido and N-methyl-p-toluenesulfonamido.

$R^6$ is preferably a substituent other than hydrogen. Namely, $R^6$ is preferably a halogen atom, a hydrocarbon group, a heterocyclic compound residual group, an oxygen-containing group, a boron-containing group, a sulfur-containing group, a silicon-containing group, a germanium-containing group, or a tin-containing group. Particularly $R^6$ is preferably a halogen atom, a hydrocarbon group, a heterocyclic compound residual group, a hydrocarbon-substituted silyl group, a hydrocarbon-substituted siloxy group, an alkoxy group, an alkylthio group, an aryloxy group, an arylthio group, an acyl group, an ester group, a thioester group, an amido group, an amino group, an imido group, an imino group, a sulfonic acid ester group, a sulfonamido group, a cyano group, a nitro group, or a hydroxyl group and further preferably a halogen atom, a hydrocarbon group, or a hydrocarbon-substituted silyl group.

Preferable examples of the hydrocarbon groups for $R^6$ include straight-chain or branched alkyl groups of 1–30 carbon atoms, preferably 1–20 carbon atoms, such as methyl, ethyl, n-propyl, isopropyl, n-butyl, isobutyl, sec-butyl, tert-butyl, neopentyl, or n-hexyl; cyclic saturated hydrocarbon groups of 3–30 carbon atoms, preferably 3–20 carbon atoms, such as cyclopropyl, cyclobutyl, cyclopentyl, cyclohexyl, or adamantyl; aryl groups of 6–30 carbon atoms, preferably 6–20 carbon atoms, such as phenyl, benzyl, naphthyl, biphenyl, or triphenyl. Aforementioned substituted groups may be further substituted with substituent, such as alkyl groups or alkoxy groups of 1–30 carbon atoms, preferably 1–20 carbon atoms, halogenated alkyl groups of 1–30 carbon atoms, preferably 1–20 carbon atoms, aryl groups or aryloxy groups of 6–30 carbon atoms, preferably 6–20 carbon atoms, halogen, a cyano group, a nitro group, or a hydroxyl group.

Preferable examples of the hydrocarbon-substituted silyl groups for $R^6$ include, methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl, dimethyl(pentafluorophenyl)silyl. Particularly preferable are trimethylsilyl, triethylphenyl, diphenylmethylsilyl, isophenylsilyl, dimethylphenylsilyl, dimethyl-t-butylsilyl, dimethyl(pentafluorophenyl)silyl.

In the present invention, preferable examples of $R^6$ is selected from the group consisting of branched alkyl groups of 3–30 carbon atoms, preferably 3–20 carbon atoms, such as isopropyl, isobutyl, sec-butyl, tert-butyl, and neopentyl;

groups in which hydrogen atoms of the aforementioned branched alkyl groups are substituted with aryl group of 6–30 carbon atoms, preferably 6–20 carbon atoms, such as cumyl;

cyclic saturated hydrocarbon groups of 3–30 carbon atoms, preferably 3–20 carbon atoms, such as adamantyl, cyclopropyl, cyclobutyl, cyclopentyl, and cyclohexyl;

aryl groups of 6–30 carbon atoms, preferably 6–20 carbon atoms such as phenyl, naphthyl, fluorenyl, anthranyl, and phenanthryl; and hydrocarbon substituted silyl group.

Two or more groups of $R^1$ to $R^6$, preferably adjacent groups, may be bonded to each other to form an aliphatic ring, an aromatic ring or a hydrocarbon ring containing a hetero atom such as a nitrogen atom and each of these rings may further contain a substituent.

When m is 2 or greater, two of $R^1$ to $R^6$ groups may be bonded. And further when m is 2 or greater, $R^1$s, $R^2$s, $R^3$s, $R^4$s, $R^5$s, or $R^6$s may be the same as or different from each other.

n is a number satisfying a valence of M, e.g. 0 to 5, preferably 1 to 4, particularly preferably 1 to 3, and X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, and when n is 2 or greater, Xs may be the same or different.

The halogen atoms include fluorine, chlorine, bromine and iodine.

Examples of the hydrocarbon groups include the same groups as previously described with respect to $R^1$ to $R^6$. Specifically, there can be mentioned alkyl groups, such as methyl, ethyl, propyl, butyl, hexyl, octyl, nonyl, dodecyl and eicosyl;

cycloalkyl groups of 3 to 30 carbon atoms, such as cyclopentyl, cyclohexyl, norbornyl and adamantyl;

alkenyl groups, such as vinyl, propenyl and cyclohexenyl;

arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthryl and phenanthryl, but not limited thereto. The hydrocarbon groups may also include halogenated hydrocarbon groups, specifically, those of 1 to 30 carbon atoms in which at least one hydrogen is replaced with halogen.

Of these, preferable are hydrocarbon groups of 1 to 20 carbon atoms.

Examples of the heterocyclic compound residual groups include the same groups as previously described with respect to $R^1$ to $R^6$.

Examples of the oxygen-containing groups include the same groups as previously described with respect to $R^1$ to $R^6$. Specifically, there can be mentioned a hydroxyl group; alkoxy groups, such as methoxy, ethoxy, propoxy and butoxy; aryloxy groups, such as phenoxy, methylphenoxy, dimethylphenoxy and naphthoxy; arylalkoxy groups, such as phenylmethoxy and phenylethoxy; an acetoxy group; and a carbonyl group, but not limited thereto.

Examples of the sulfur-containing groups include the same groups as previously described with respect to $R^1$ to $R^6$. Specifically, there can be mentioned sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; sulfinato groups, such as methylsulfinato, phenylsulfinato, benzylsulfinato, p-toluenesulfinato, trimethylbenzenesulfinato and pentafluorobenzenesulfinato; alkylthio groups; and arylthio groups, but not limited thereto.

Examples of the nitrogen-containing groups include the same groups as previously described with respect to $R^1$ to $R^6$. Specifically, there can be mentioned an amino group; alkylamino groups, such as methylamino, dimethylamino, diethylamino, dipropylamino, dibutylamino and dicyclohexylamino; and arylamino or alkylarylamino groups, such as phenylamino, diphenylamino, ditolylamino, dinaphthylamino and methylphenylamino, but not limited thereto.

Examples of the boron-containing groups include $BR_4$ (R is hydrogen, an alkyl group, an aryl group which may have a substituent, a halogen atom or the like).

Examples of the phosphorus-containing groups include trialkylphosphine groups, such as trimethylphosphine, tributylphosphine and tricyclohexylphosphine; triarylphosphine groups, such as triphenylphosphine and tritolylphosphine; phosphite groups (phosphido groups), such as methylphosphite, ethylphosphite and phenylphosphite; a phosphonic acid group; and a phosphinic acid group, but not limited thereto.

Examples of the silicon-containing groups include the same groups as previously described with respect to $R^1$ to $R^6$. Specifically, there can be mentioned hydrocarbon-substituted silyl groups, such as phenylsilyl, diphenylsilyl, trimethylsilyl, triethylsilyl, tripropylsilyl, tricyclohexylsilyl, triphenylsilyl, methyldiphenylsilyl, tritolylsilyl and trinaphthylsilyl; hydrocarbon-substituted silyl ether groups, such as trimethylsilyl ether; silicon-substituted alkyl groups, such as trimethylsilylmethyl; and silicon-substituted aryl groups, such as trimethylsilylphenyl.

Examples of the germanium-containing groups include the same groups as previously described with respect to $R^1$ to $R^6$. Specifically, there can be mentioned groups wherein silicon is replaced with germanium in the aforesaid silicon-containing groups.

Examples of the tin-containing groups include the same groups as previously described with respect to $R^1$ to $R^6$. Specifically, there can be mentioned groups wherein silicon is replaced with tin in the aforesaid silicon-containing groups.

Examples of the halogen-containing groups include fluorine-containing groups, such as $PF_6$ and $BF_4$; chlorine-containing groups, such as $ClO_4$ and $SbCl_6$; and iodine-containing groups, such as $IO_4$, but not limited to thereto.

Examples of the aluminum-containing groups include $AlR_4$ (R is hydrogen, an alkyl group, an aryl group which may have a substituent, a halogen atom or the like), but not limited thereto.

When n is 2 or greater, plural groups represented by X may be the same as or different from each other, and plural groups represented by X may be bonded to each other to form a ring.

Below, examples of transition metal compounds represented by the formula (II) are given, but not limited thereto.

In the following examples, M is a transition metal atom and each represents Sc(III), Ti(III), Ti(IV), Zr(III), Zr(IV), Hf(IV), V(IV), Nb(V), Ta(V), Co(II), Co(III), Rh(II), Rh(III), or Rh(IV), but not limited thereto. Of these, preferable are Ti(IV), Zr(IV), Hf(IV), particularly preferable is Ti(IV).

X is for example halogen such as Cl or Br, or an alkyl group such as methyl, but not limited thereto. When plural X are present, they may be the same as or different from each other.

n is decided by a valence of the metal M. For example, when two monoanions are bonded to the metal, there can be mentioned n=0 in case of a divalent metal, n=1 in case of a trivalent metal, n=2 in case of a tetravalent metal, and n=3 in case of a pentavalent metal. More specifically, there can be mentioned n=2 in case of Ti(IV), n=2 in case of Zr(IV), and n=2 in case of Hf(IV).

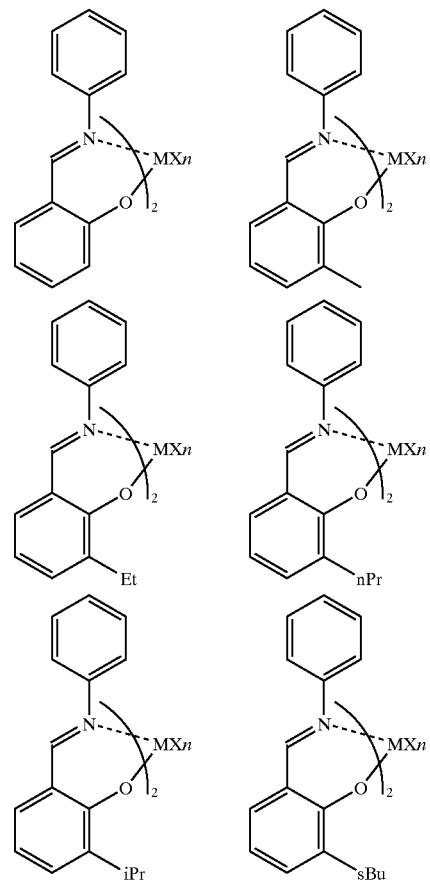

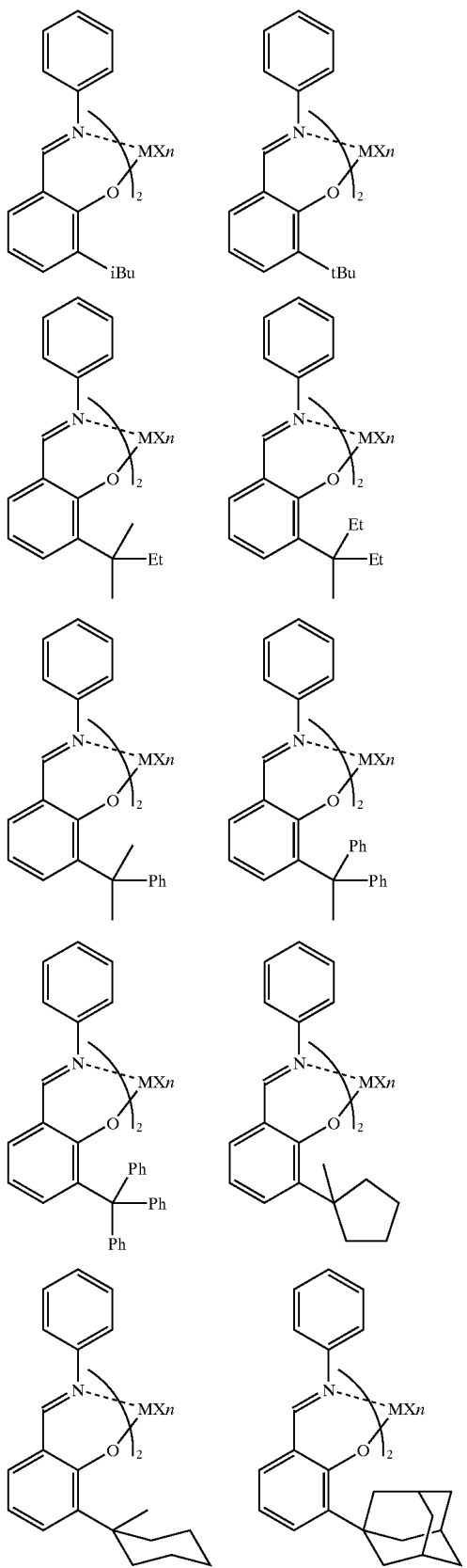
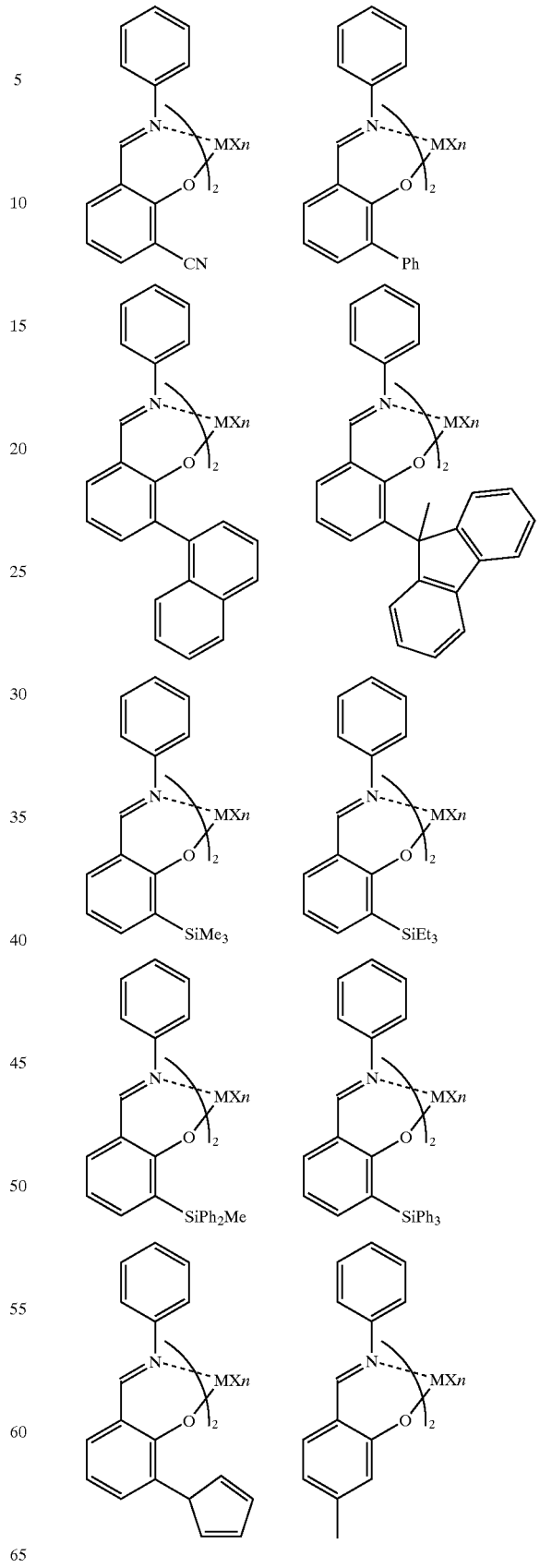

-continued
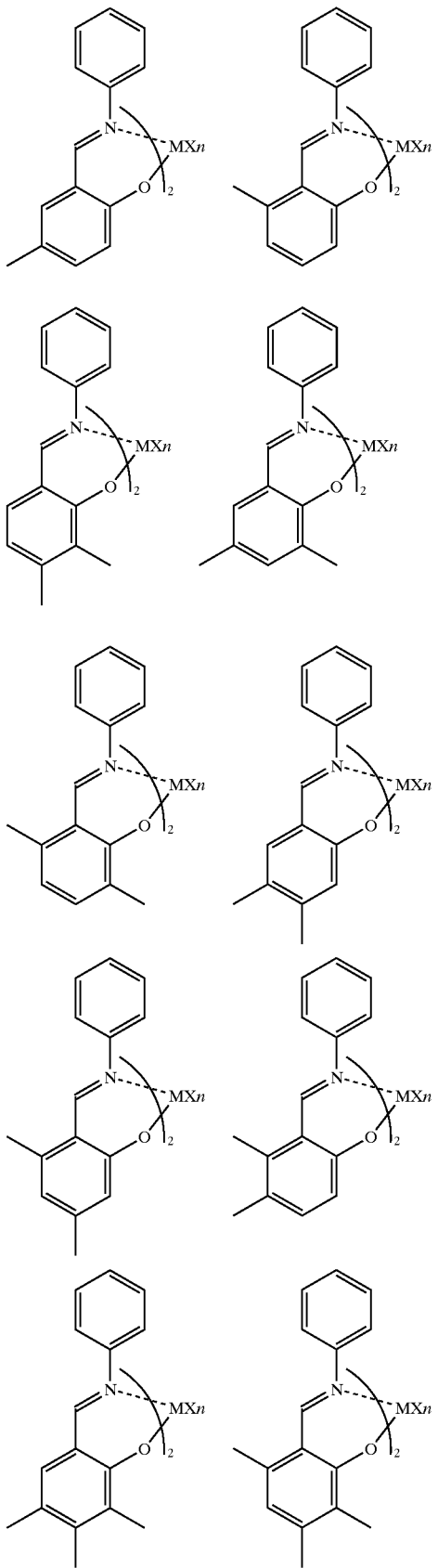
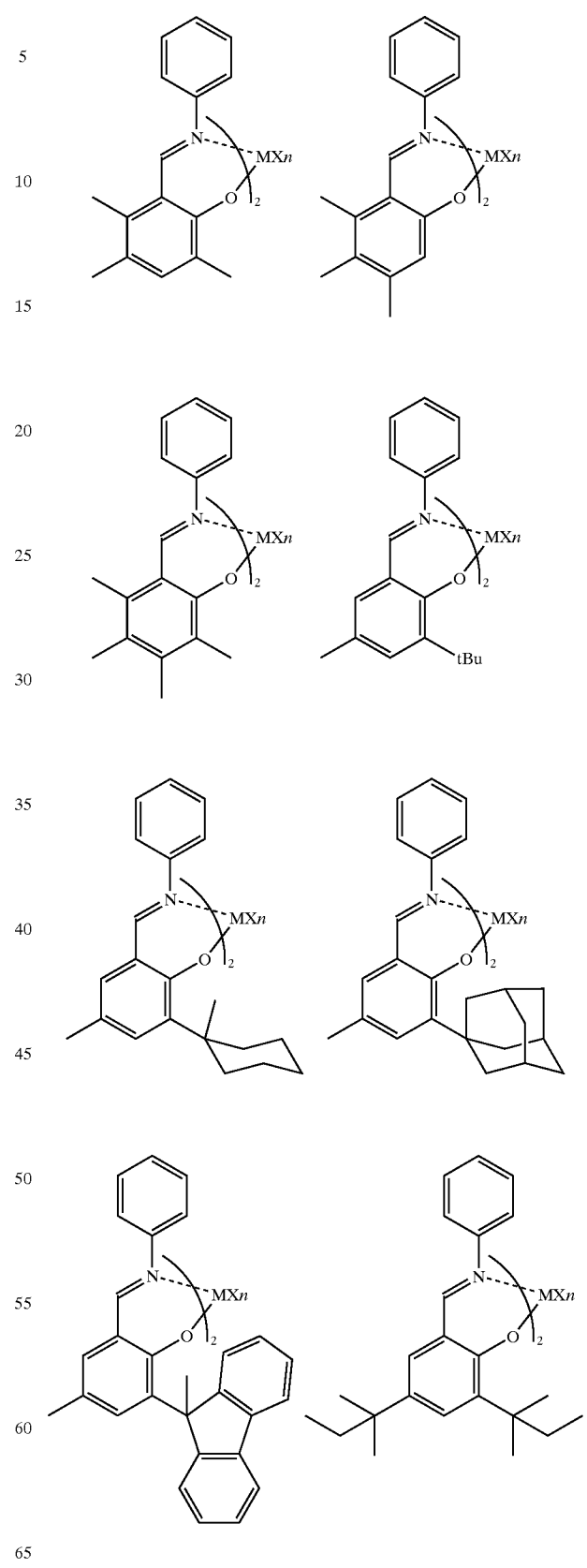

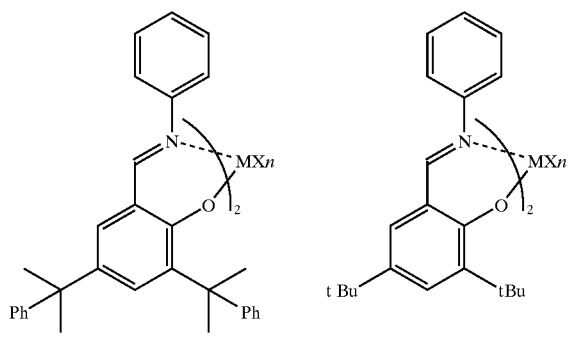
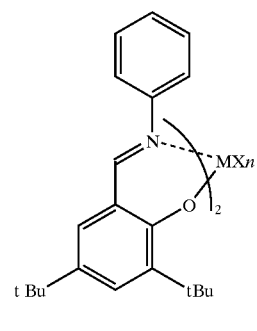
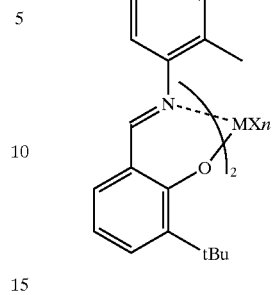
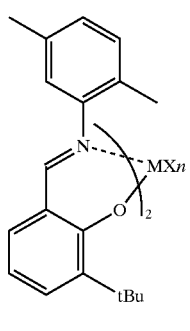
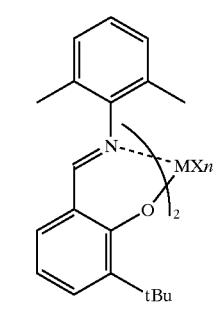
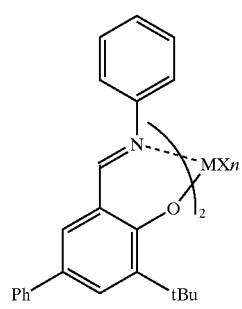
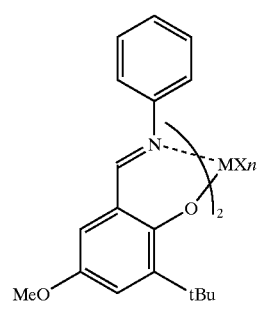
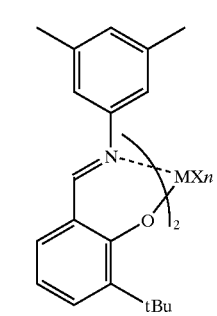
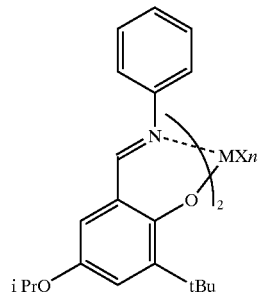
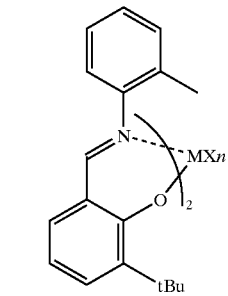
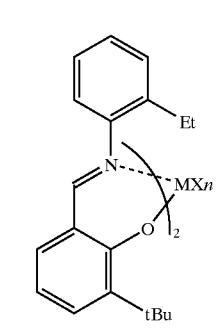
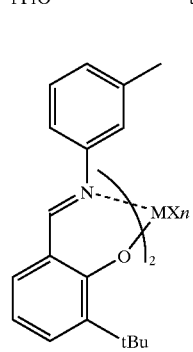
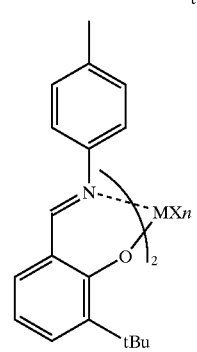
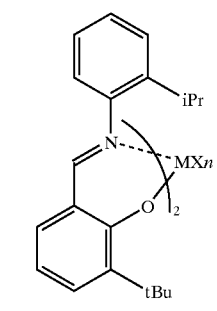
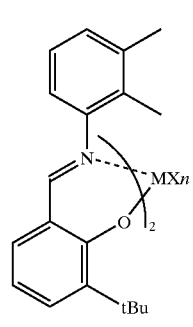
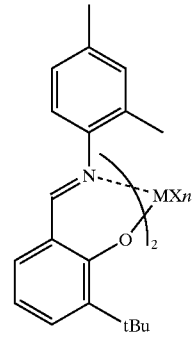
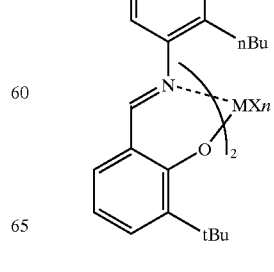
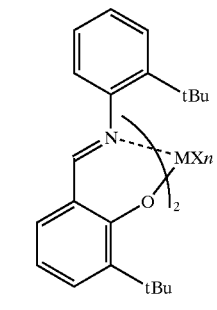

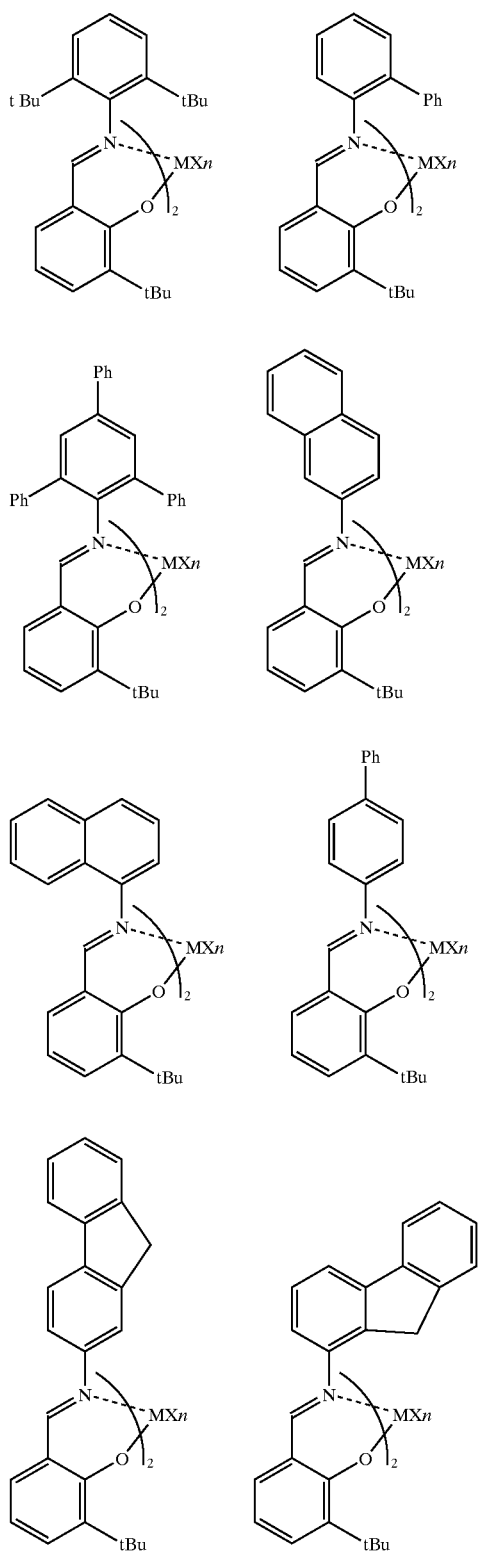
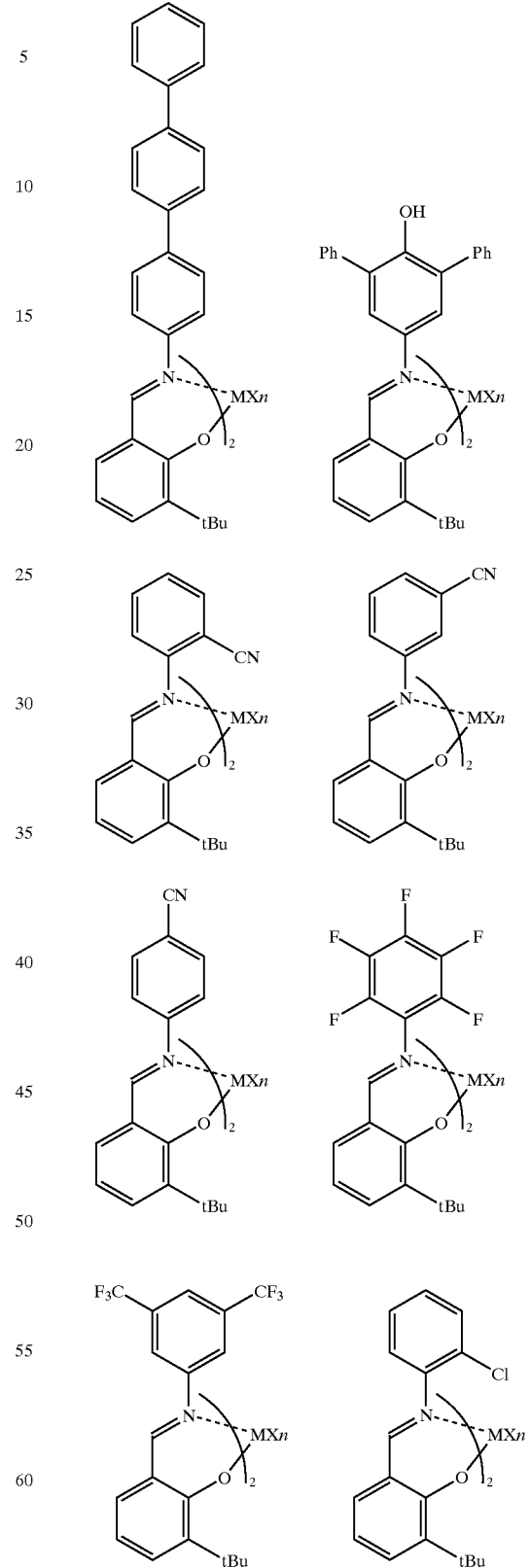

-continued
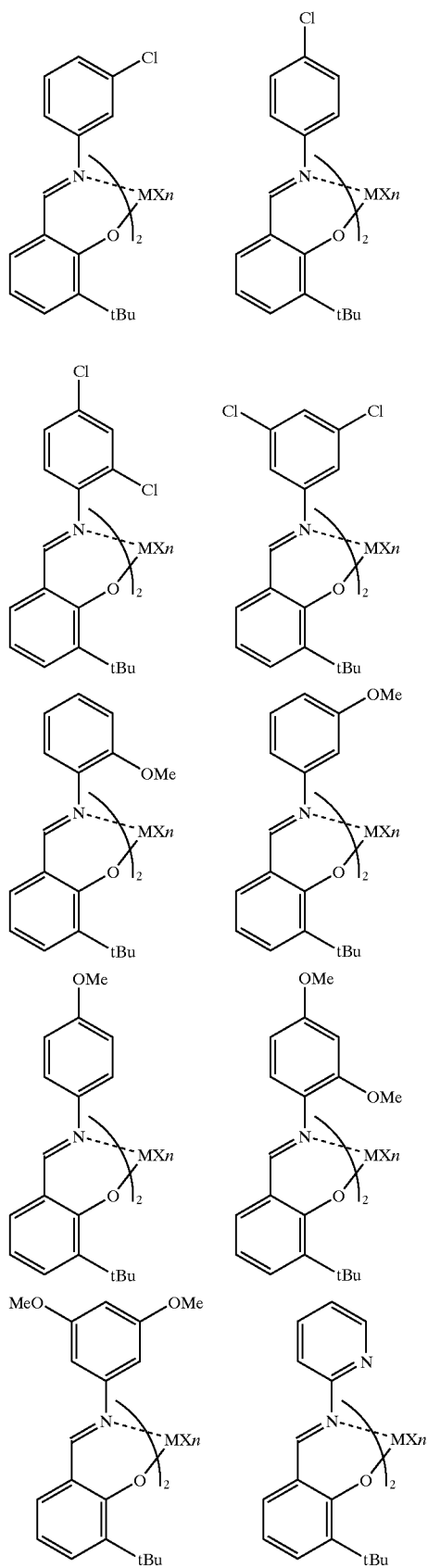
-continued
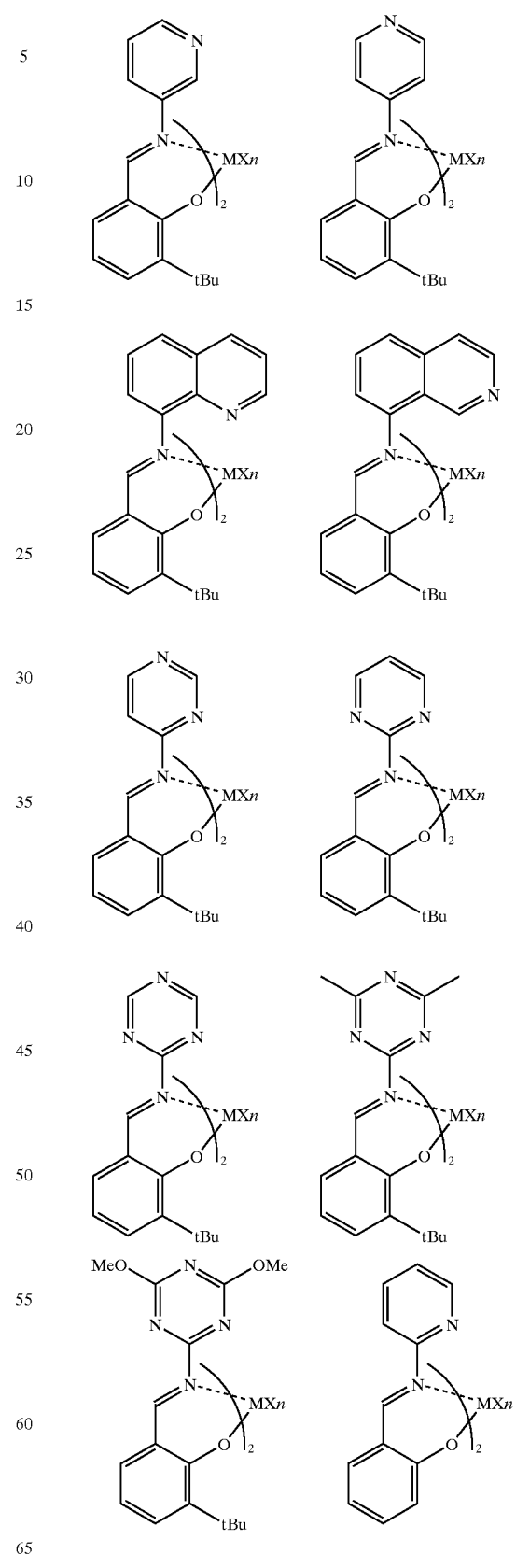

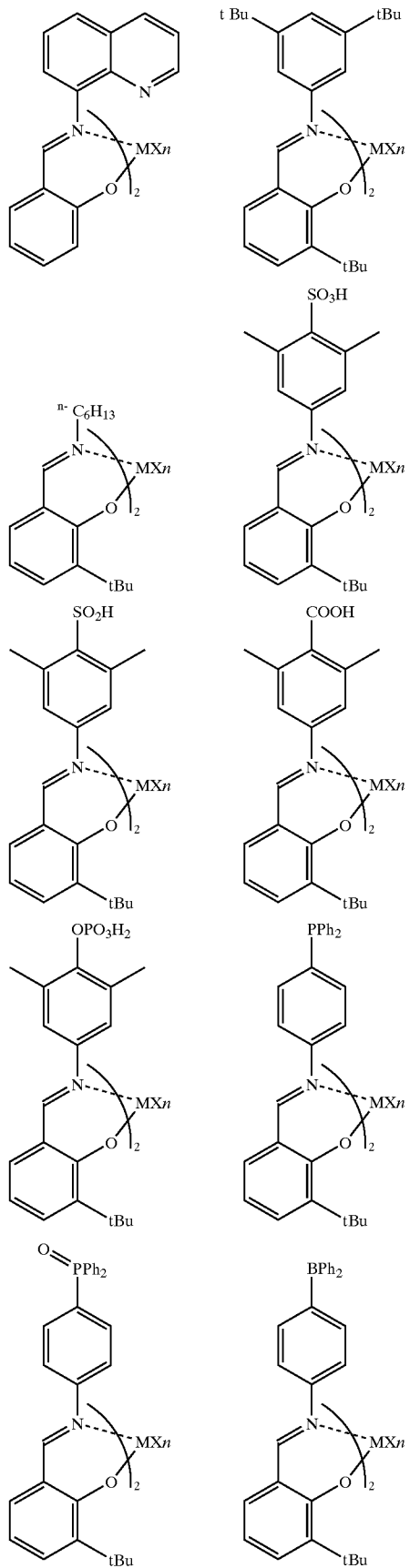
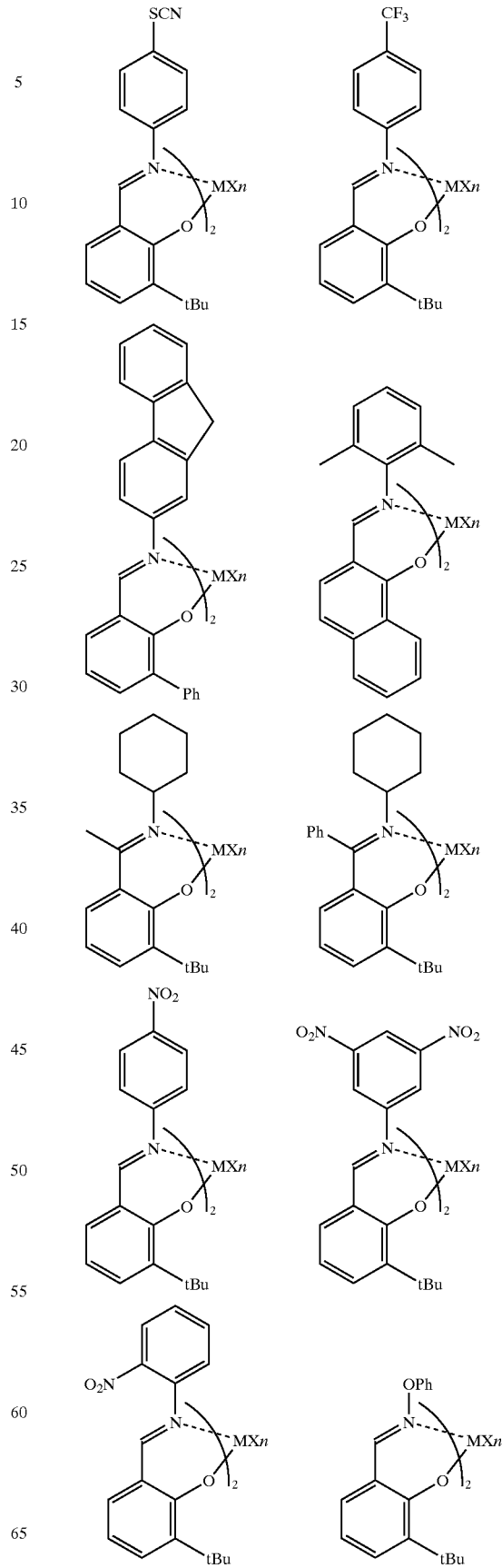

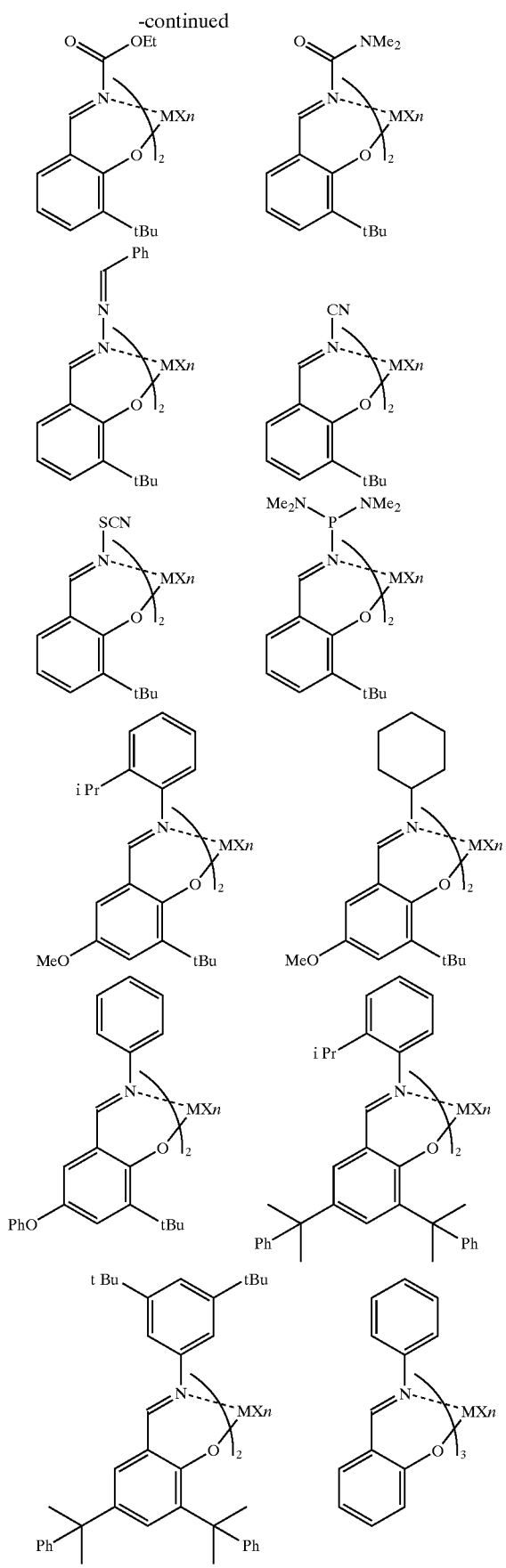
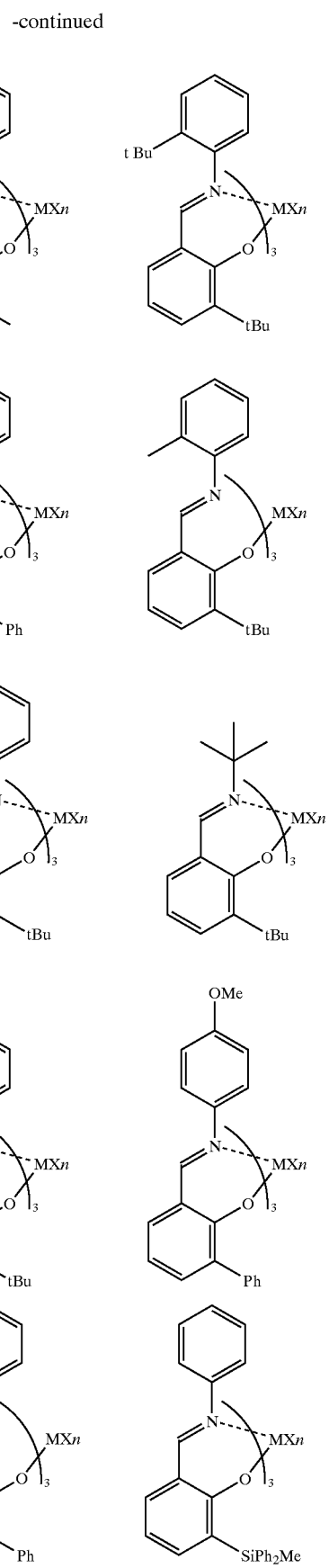

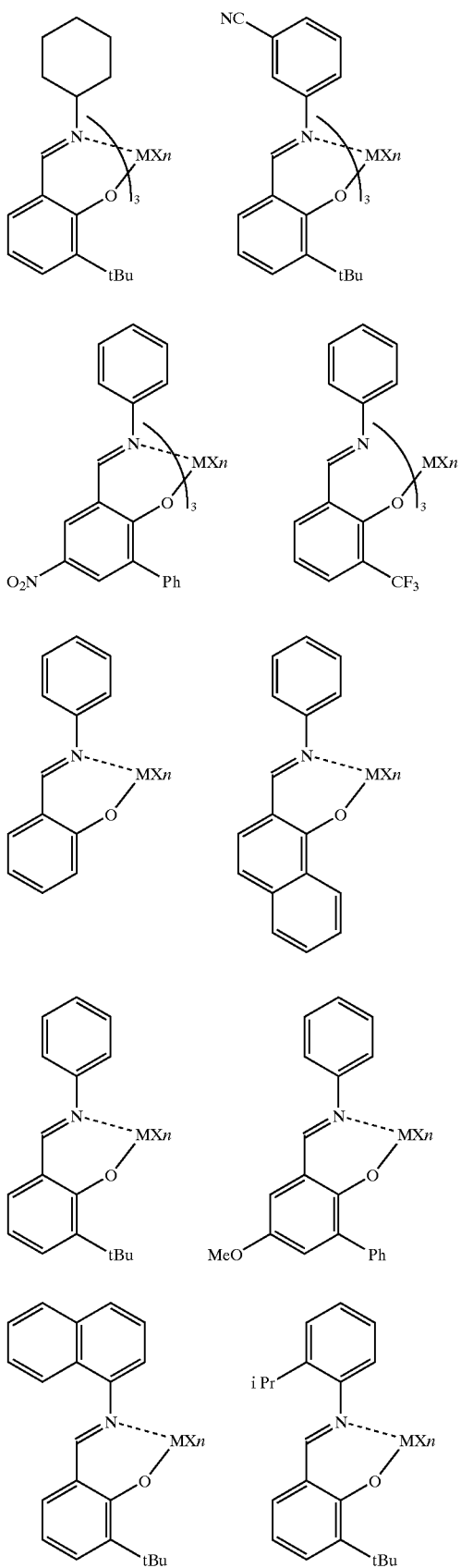
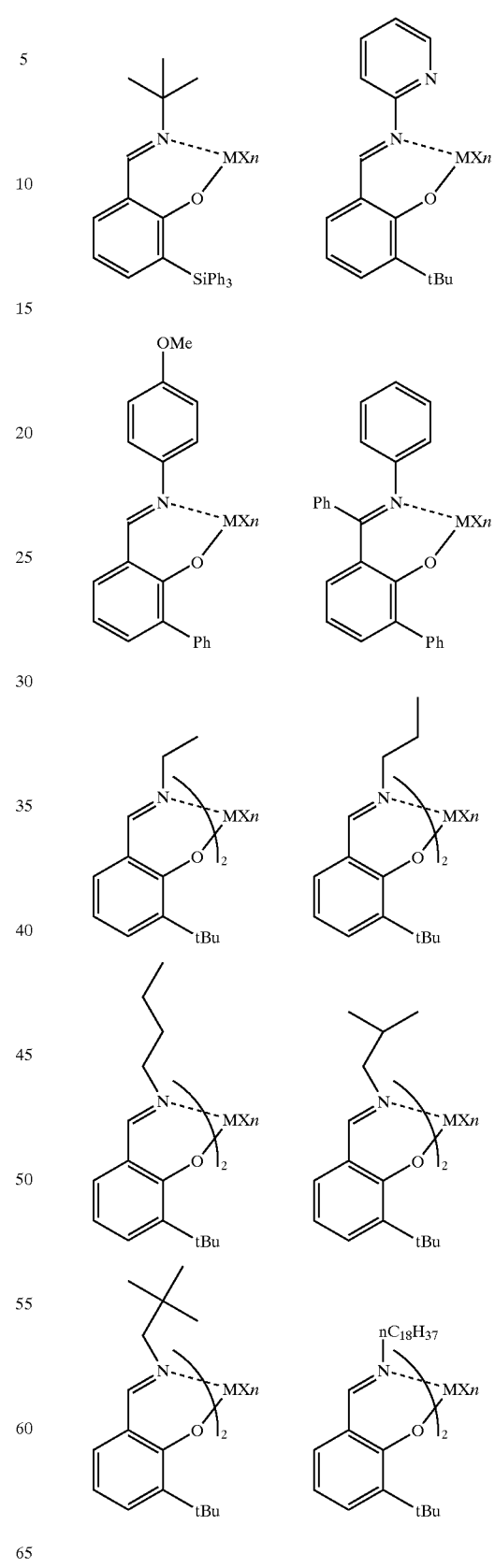

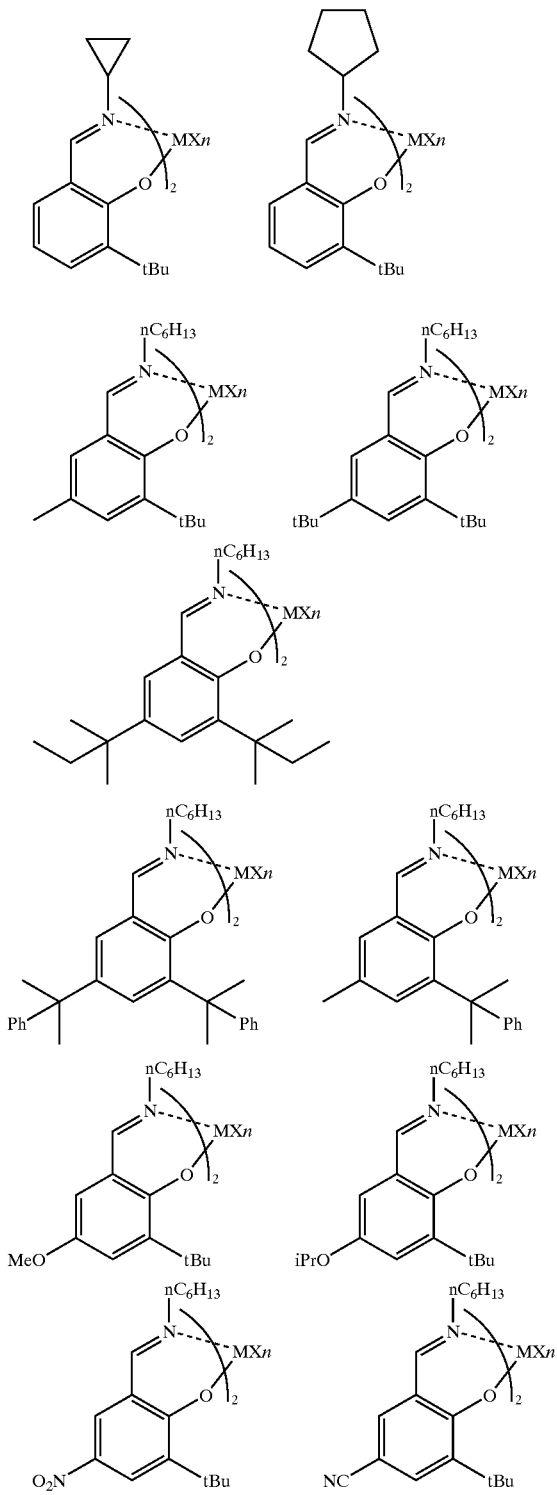

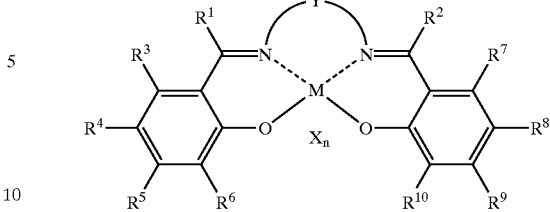

In the above examples, Me denotes methyl, Et denotes ethyl, iPr denotes i-propyl, tBu denotes tert-butyl, and Ph denotes phenyl.

Examples of transition metal compounds (B) represented by the formula (II) include transition metal compounds represented by the following formula (II-a);

wherein

M is a transition metal atom selected from Group 3 to Group 11 of the periodic table;

$R^1$ to $R^{10}$ may be the same as or different from each other, and is a hydrogen atom, a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group, and two or more of them may be bonded to each other to form a ring;

n is a number satisfying a valence of M;

X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, when n is 2 or greater, plural groups represented by X may be the same as or different from each other, and plural groups represented by X may be bonded to each other to form a ring;

Y is a divalent bonding group containing at least one atom selected from the group of oxygen, sulfur, carbon, nitrogen, phosphorus, silicon, selenium, tin and boron.

In the general formula (II-a), at least one of $R^6$ and $R^{10}$, particularly both of them, is preferably a halogen atom, a hydrocarbon group, a heterocyclic compound residual group, an oxygen-containing group, a nitrogen-containing group, a boron-containing group, a sulfur-containing group, a phosphorus-containing group, a silicon-containing group, a germanium-containing group or a tin-containing group.

In the formula (II-a), M, $R^1$ to $R^{10}$ and X are the same as those of M, $R^1$ to $R^6$ and X in the compound represented by the formula (II).

X is preferably halogen atom, hydrocarbon group of 1–20 carbon atoms or sulfonate group. When n is 2 or greater, ring formed by bonding two or more of X may be aromatic ring or aliphatic ring.

Y is, as described above, a divalent bonding group containing at least one atom selected from the group of oxygen, sulfur, carbon, nitrogen, phosphorus, silicon, selenium, tin and boron.

Each of these bonding group Y preferably has a structure wherein the main chain is constituted of 3 or more atoms, preferably 4 to 20 atoms, particularly preferably 4 to 10 atoms.

The bonding group may have a substituent.

Examples of a divalent bonding group Y include groups containing chalcogen atoms such as —O—, —S— and —Se—; nitrogen- or phosphorus-containing groups, such as —NH—, —N(CH$_3$)—, —PH— and —P(CH$_3$)—; silicon atom-containing groups, such as —SiH$_2$— and —Si(CH$_3$)$_2$—; tin atom-containing groups, such as —SnH$_2$— and —Sn(CH$_3$)$_2$—; and boron atom—containing groups, such as —BH—, — B(CH$_3$)— and —BF—. Hydrocarbon-containing groups are not limited, however, examples of the groups are saturated hydrocarbon groups of 3–20 carbon atoms, such as —(CH$_2$)$_4$—, —(CH$_2$)$_5$—, —(CH$_2$)$_6$—; cyclic saturated hydrocarbon groups, such as a cyclohexylidene group and a cyclohexylene group; groups in which a part of the above saturated hydrocarbon group is substituted by a hydrocarbon of 1–10 carbon atoms, halogen such as fluorine, chlorine and bromine and a hetero atom such as oxygen, sulfur, nitrogen, phosphorus, silicon, selenium, tin and boron; residual groups of cyclic hydrocarbons of 6–20 carbon atoms, such as benzene, naphthalene and anthracene; and residual groups of cyclic compounds having 3 to 20 carbon atoms and containing hetero atoms, such as pyridine, quinoline, thiophene and furan.

Examples of the transition metal compounds represented by the above formula (II-b) are given below, but not limited thereto.

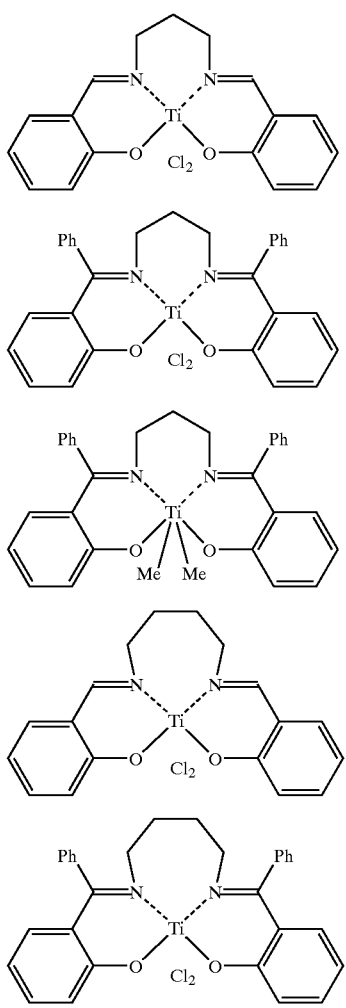

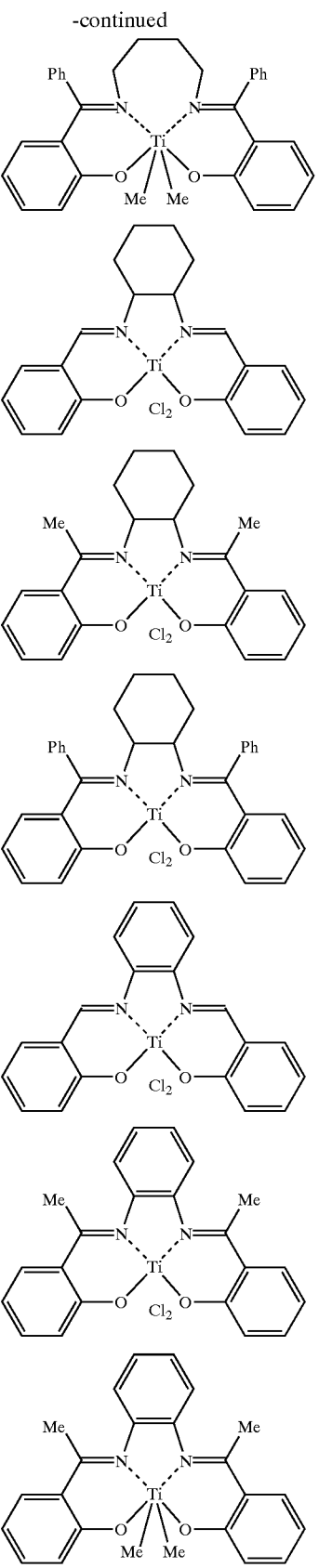

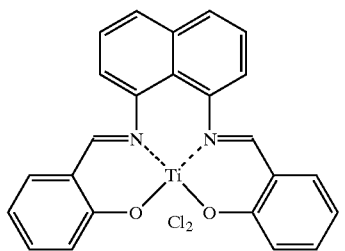
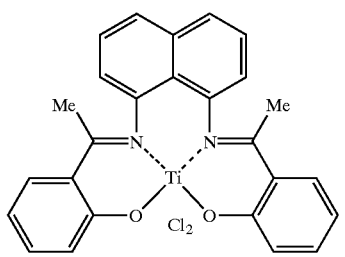
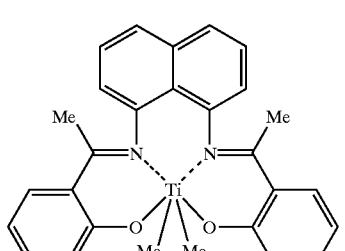
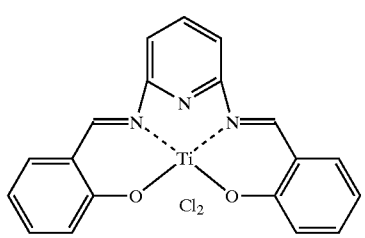
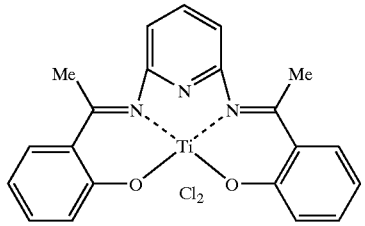
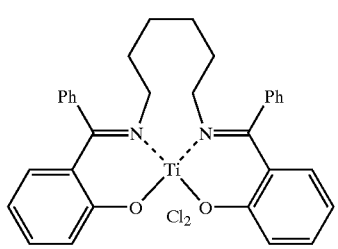
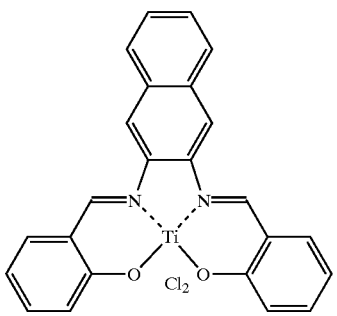
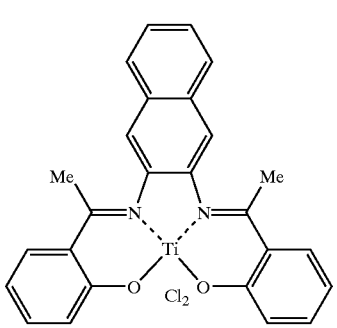
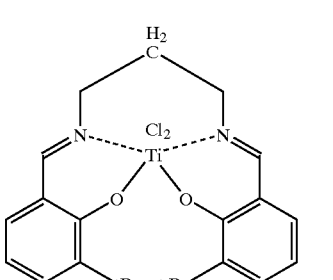
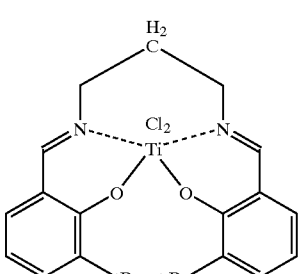

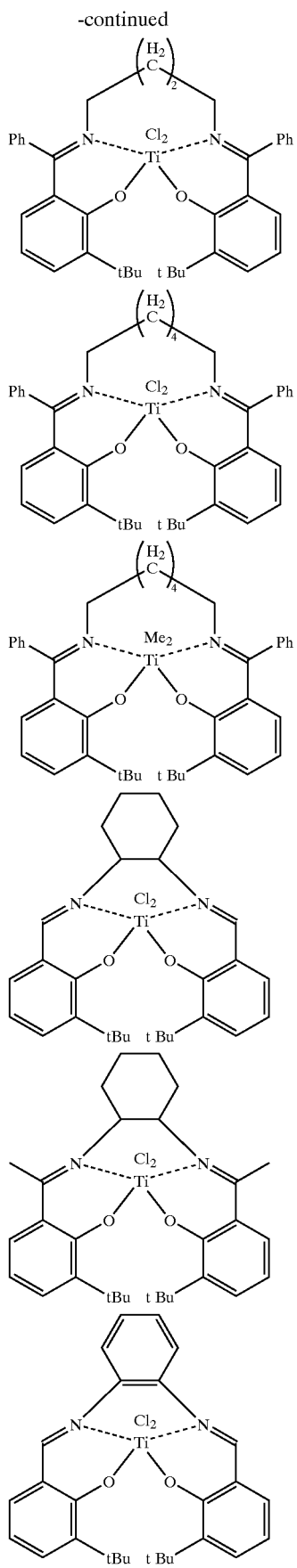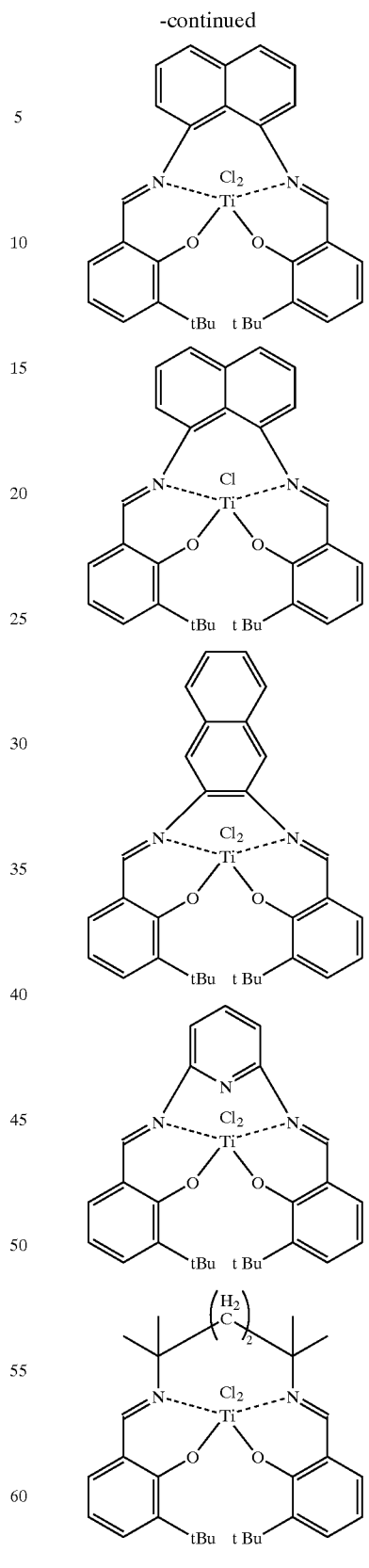

-continued

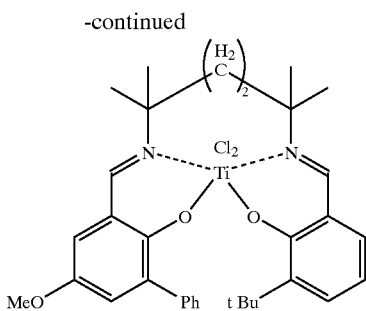

In the above examples, Me denotes methyl and Ph denotes phenyl.

According to the present invention, transition metal compounds wherein a titanium metal is replaced by a metal other than titanium, such as zirconium or hafnium, can be used instead of the above compounds.

(B-1) Organometallic Compound

Examples of the organometallic compounds (B-1) which are used in the invention include organometallic compounds containing metals of Group 1, Group 2, Group 12 and Group 13 of the periodic table, such as those described below.

(B-1) Organoaluminum compound represented by the following formula:

$$R^a{}_m Al(OR^b)_n H_p X_q$$

wherein $R^a$ and $R^b$ may be the same or different and are each a hydrocarbon group of 1 to 15 carbon atoms, preferably 1 to 4 carbon atoms; X is a halogen atom; and m, n, p and q are numbers satisfying the conditions of $0<m\leq3$, $0\leq n\leq3$, $0\leq p<3$, $0\leq q<3$ and $m+n+p+q=3$.

(B-1b) Alkyl complex compound comprising a metal of Group 1 of the periodic table and aluminum and represented by the following formula:

$$M^2 AlR^a{}_4$$

wherein $M^2$ is Li, Na or K; and $R^a$ is a hydrocarbon group of 1 to 15 carbon atoms, preferably 1 to 4 carbon atoms.

(B-1c) Dialkyl compound containing a metal of Group 2 or Group 12 of the periodic table and represented by the following formula:

$$R^a R^b M^3$$

wherein $R^a$ and $R^b$ may be the same or different and are each a hydrocarbon group of 1 to 15 carbon atoms, preferably 1 to 4 carbon atoms; and $M^3$ is Mg, Zn or Cd.

Examples of the organoaluminum compounds (B-1a) include:

an organoaluminum compound represented by the following formula:

$$R^a{}_m Al(OR^b)_{3-m}$$

wherein $R^a$ and $R^b$ may be the same or different and are each a hydrocarbon group of 1 to 15 carbon atoms, preferably 1 to 4 carbon atoms, and m is preferably a number satisfying the condition of $1.5\leq m\leq3$;

an organoaluminum compound represented by the following formula:

$$R^a{}_m AlX_{3-m}$$

wherein $R^a$ is a hydrocarbon group of 1 to 15 carbon atoms, preferably 1 to 4 carbon atoms, X is a halogen atom, and m is preferably a number satisfying the condition of $0<m<3$;

an organoaluminum compound represented by the following formula:

$$R^a{}_m AlH_{3-m}$$

wherein $R^a$ is a hydrocarbon group of 1 to 15 carbon atoms, preferably 1 to 4 carbon atoms, and m is preferably a number satisfying the condition of $2\leq m<3$; and an organoaluminum compound represented by the following formula:

$$R^a{}_m Al(OR^b)_n X_q$$

wherein $R^a$ and $R^b$ may be the same or different and are each a hydrocarbon group of 1 to 15 carbon atoms, preferably 1 to 4 carbon atoms, X is a halogen atom, and m, n and q are numbers satisfying the conditions of $0<m\leq3$, $0\leq n<3$, $0\leq q<3$ and $m+n+q=3$.

Particular examples of the organoaluminum compounds (B-1a) include:

tri-n-alkylaluminums, such as trimethylaluminum, triethylaluminum, tri-n-butylaluminum, tripropylaluminum, tripentylaluminum, trihexylaluminum, trioctylaluminum and tridecylaluminum;

branched-chain trialkylaluminums, such as triisopropylaluminum, triisobutylaluminum, tri-sec-butylaluminum, tri-tert-butylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum and tri-2-ethylhexylaluminum;

tricycloalkylaluminums, such as tricyclohexylaluminum and tricyclooctylaluminum;

triarylaluminums, such as triphenylaluminum and tritolylaluminum;

dialkylaluminum hydrides, such as diisobutylaluminum hydride;

trialkenylaluminums, e.g., those represented by the formula $(i-C_4H_9)_x Al_y(C_5H_{10})_z$ (wherein x, y and z are each a positive number, and $z\geq2x$), such as triisoprenylaluminum;

alkylaluminum alkoxides, such as isobutylaluminum methoxide, isobutylaluminum ethoxide and isobutylaluminum isopropoxide;

dialkylaluminum alkoxides, such as dimethylaluminum methoxide, diethylaluminum ethoxide and dibutylaluminum butoxide;

alkylaluminum sesquialkoxides, such as ethylaluminum sesquiethoxide and butylaluminum sesquibutoxide;

partially alkoxylated alkylaluminums, such as those having an average composition represented by $R^a{}_{2.5}Al(OR^b)_{0.5}$;

dialkylaluminum aryloxides, such as diethylaluminum phenoxide, diethylaluminum(2,6-di-t-butyl-4-methylphenoxide), ethylaluminumbis(2,6-di-t-butyl-4-methylphenoxide), diisobutylalumium(2,6-di-t-butyl-4-methylphenoxide) and isobutylaluminumbis(2,6-di-t-butyl-4-methylphenoxide);

dialkylaluminum halides, such as dimethylaluminum chloride, diethylaluminum chloride, dibutylaluminum chloride, diethylaluminum bromide and diisobutylaluminum chloride;

alkylaluminum sesquihalides, such as ethylaluminum sesquichloride, butylaluminum sesquichloride and ethylaluminum sesquibromide, partially halogenated alkylaluminums, e.g., alkylaluminum dihalides such as ethylaluminum dichloride, propylaluminum dichloride and butylaluminum dibromide;

dialkylaluminum hydrides, such as diethylaluminum hydride and dibutylaluminum hydride;

partially hydrogenated alkylaluminums, e.g., alkylaluminum dihydrides, such as ethylaluminum dihydride and propylaluminum dihydride; and partially alkoxylated and halogenated alkylaluminums, such as ethylaluminum ethoxychloride, butylaluminum butoxychloride and ethylaluminum ethoxybromide.

Also employable are compounds analogous to the organoaluminum compound (B-1a). For example, there can be mentioned organoaluminum compounds wherein two or more aluminum compounds are combined through a nitrogen atom, such as $(C_2H_5)_2AlN(C_2H_5)Al(C_2H_5)_2$.

Examples of the compounds (B-1b) include $LiAl(C_2H_5)_4$ and $LiAl(C_7H_{15})_4$.

Other compounds, also employable as the organometallic compounds (B-1) include methyllithium, ethyllithium, propyllithium, butyllithium, methylmagnesium bromide, methylmagnesium chloride, ethylmagnesium bromide, ethylmagnesium chloride, propylmagnesium bromide, propylmagnesium chloride, butylmagnesium bromide, butylmagnesium chloride, dimethylmagnesium, diethylmagnesium, dibutylmagnesium and butylethylmagnesium.

Combinations of compounds capable of producing the above-mentioned organoaluminum compounds in the polymerization system, e.g., a combination of halogenated aluminum and alkyllithium and a combination of halogenated aluminum and alkylmagnesium, are also employable.

Of the organometallic compounds (B-1), the organoaluminum compounds are preferable.

The organometallic compounds (B-1) mentioned above are used singly or in combination of two or more kinds.

(B-2) Organoaluminum Oxy-compound

The organoaluminum oxy-compound (B-2) which is optionally used in the invention may be conventional aluminoxane or a benzene-insoluble organoaluminum oxy-compound such as exemplified in Japanese Patent Laid-Open Publication No. 78687/1990.

The conventional aluminoxane can be prepared by, for example, the following processes, and is generally obtained as a hydrocarbon solvent solution.

(1) An organoaluminum compound such as trialkylaluminum is added to a hydrocarbon medium suspension of a compound containing adsorption water or a salt containing water of crystallization, e.g., magnesium chloride hydrate, copper sulfate hydrate, aluminum sulfate hydrate, nickel sulfate hydrate or cerous chloride hydrate, to allow the organoaluminum compound to react with the adsorption water or the water of crystallization.

(2) Water, ice or water vapor is allowed to directly act on an organoaluminum compound such as trialkylaluminum in a medium such as benzene, toluene, ethyl ether or tetrahydrofuran.

(3) An organotin oxide such as dimethyltin oxide or dibutyltin oxide is allowed to react with an organoaluminum compound such as trialkylaluminum in a medium such as decane, benzene or toluene.

The aluminoxane may contain a small amount of an organometallic component. Further, it is possible that the solvent or the unreacted organoaluminum compound is distilled off from the recovered solution of aluminoxane and the remainder is redissolved in a solvent or suspended in a poor solvent for aluminoxane.

Examples of the organoaluminum compounds used for preparing the aluminoxane include the same organoaluminum compounds as previously described with respect to the organoaluminum compound (B-1a).

Of these, preferable are trialkylaluminums and tricycloalkylaluminums. Particularly preferable is trimethylaluminum.

The organoaluminum compounds are used singly or in combination of two or more kinds.

Examples of the solvents used for preparing the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; and halogenated products of these aromatic, aliphatic and alicyclic hydrocarbons (e.g., chlorinated or brominated products thereof). Also employable are ethers such as ethyl ether and tetrahydrofuran. Of the solvents, particularly preferable are aromatic hydrocarbons and aliphatic hydrocarbons.

The benzene-insoluble organoaluminum oxy-compound for use in the invention is preferably an organoaluminum oxy-compound containing an Al component which is soluble in benzene at 60° C., in an amount of usually not more than 10%, preferably not more than 5%, particularly preferably not more than 2%, in terms of Al atom. That is, the benzene-insoluble organoaluminum oxy-compound is preferably insoluble or sparingly soluble in benzene.

The organoaluminum oxy-compound for use in the invention is, for example, an organoaluminum oxy-compound containing boron and represented by the following formula (III):

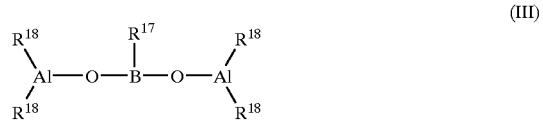

wherein $R^{17}$ is a hydrocarbon group of 1 to 10 carbon atoms; and each $R^{18}$ may be the same or different and is a hydrogen atom, a halogen atom or a hydrocarbon group of 1 to 10 carbon atoms.

The organoaluminum-oxy compound containing boron and represented by the formula (III) can be prepared by allowing an alkylboronic acid represented by the following formula (IV):

wherein $R^{17}$ is the same group as described above, to react with an organoaluminum compound in an inert solvent at a temperature of −80° C. to room temperature for 1 minute to 24 hours under an inert gas atmosphere.

Examples of the alkylboronic acids represented by 20 the formula (IV) include methylboronic acid, ethylboronic acid, isopropylboronic acid, n-propylboronic acid, n-butylboronic acid, isobutylboronic acid, n-hexylboronic acid, cyclohexylboronic acid, phenylboronic acid, 3,5-difluoroboronic acid, pentafluorophenylboronic acid and 3,5-bis(trifluoromethyl) phenylboronic acid. Of these, preferable are methylboronic acid, n-butylboronic acid, isobutylboronic acid, 3,5-difluorophenylboronic acid and pentafluorophenylboronic acid.

These alkylboronic acids are used singly or in combination of two or more kinds.

Examples of the organoaluminum compounds to be reacted with the alkylboronic acid include the same organoaluminum compounds as previously described with respect to the organoaluminum compound (B-1a).

Of these, preferable are trialkylaluminums and tricycloalkylaluminums. Particularly preferable are trimethylaluminum, triethylaluminum and triisobutylaluminum. These organoaluminum compounds are used singly or in combination of two or more kinds.

The organoaluminum oxy-compounds (B-2) mentioned above are used singly or in combination of two or more kinds.

(B-3) Compound which Reacts with the Transition Metal Compound to form Ion Pair Examples of the compound (B-3) which reacts with a transition metal compound (A) to form an ion pair (referred to as "ionizing ionic compound" hereinafter), that is used in the invention, include Lewis acids, an ionic compounds, borane compounds and carborane compounds described in Japanese Patent Laid-Open Publications No. 501950/1989, No. 502036/1989, No. 179005/1991, No. 179006/1991, No. 207703/1991 and No. 207704/1991, and U.S. Pat. No. 5,321,106. A heteropoly compound and an isopoly compound may also be employed.

The Lewis acids are, for example, compounds represented by $BR_3$ (R is fluorine or a phenyl group which may have a substituent such as fluorine, methyl or trifluoromethyl). Examples of such compounds include trifluoroboron, triphenylboron, tris(4-fluorophenyl)boron, tris(3,5-difluorophenyl)boron, tris(4-fluoromethylphenyl)boron, tris (pentafluorophenyl)boron, tris(p-tolyl)boron, tris(o-tolyl) boron and tris(3,5-dimethylphenyl)boron.

The ionic compounds are, for example, compounds represented by the following formula (V):

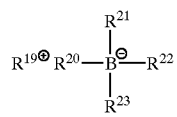

(V)

In the above formula, $R^{19}$ is $H^+$, carbonium cation, oxonium cation, ammonium cation, phosphonium cation, cycloheptyltrienyl cation, ferrocenium cation having a transition metal, or the like.

$R^{20}$ to $R^{23}$ may be the same or different and are each an organic group, preferably an aryl group or a substituted aryl group.

Examples of the carbonium cations include tri-substituted carbonium cations, such as triphenylcarbonium cation, tri (methylphenyl)carbonium cation and tri(dimethylphenyl) carbonium cation.

Examples of the ammonium cations include trialkylammonium cations, such as trimethylammonium cation, triethylammonium cation, tripropylammonium cation, tributylammonium cation and tri(n-butyl)ammonium cation; N,N-dialkylanilinium cations, such as N,N-dimethylanilinium cation, N,N-diethylanilinium cation and N,N-2,4,6 -pentamethylanilinium cation; and dialkylammonium cations, such as di(isopropyl)ammonium cation and dicyclohexylammonium cation.

Examples of the phosphonium cations include triarylphosphonium cations, such as triphenylphosphonium cation, tri(methylphenyl)phosphonium cation and tri (dimethylphenyl)phosphonium cation.

$R^{19}$ is preferably carbonium cation or ammonium cation, particularly preferably triphenylcarbonium cation, N,N-dimethylanilinium cation or N,N-diethylanilinium cation.

Also employable as the ionic compound is a trialkyl-substituted ammonium salt, a N,N-dialkylanilinium salt, a dialkylammonium salt or a triarylphosphonium salt.

Examples of the trialkyl-substituted ammonium salts include triethylammoniumtetra(phenyl)boron, tripropylammoniumtetra(phenyl)boron, tri(n-butyl)ammoniumtetra(phenyl)boron, trimethylammoniumtetra(p-tolyl)boron, trimethylammoniumtetra(o-tolyl)boron, tri(n-butyl)ammoniumtetra(pentafluorophenyl)boron, tripropylammoniumtetra(o,p-dimethylphenyl)boron, tri(n-butyl)ammoniumtetra(m,m-dimethylphenyl)boron, tri(n-butyl)ammoniumtetra(p-trifluoromethylphenyl) boron, tri(n-butyl)ammoniumtetra(3,5-ditrifluoromethylphenyl)boron and tri(n-butyl)ammoniumtetra(o-tolyl)boron.

Examples of the N,N-dialkylanilinium salts include N,N-dimethylaniliniumtetra(phenyl)boron, N,N-diethylaniliniumtetra(phenyl)boron and N,N-2,4,6-pentamethylaniliniumtetra(phenyl)boron.

Examples of the dialkylammonium salts include di(1-propyl)ammoniumtetra(pentafluorophenyl)boron and dicyclohexylammoniumtetra(phenyl)boron.

Further employable as the ionic compounds are triphenylcarbeniumtetrakis(pentafluorophenyl)borate, N,N-dimethylaniliniumtetrakis(pentafluorophenyl)borate, ferroceniumtetra(pentafluorophenyl)borate, triphenylcarbeniumpentaphenylcyclopentadienyl complex, N,N-diethylaniliniumpentaphenylcyclopentadienyl complex and a boron compound represented by the formula (VI):

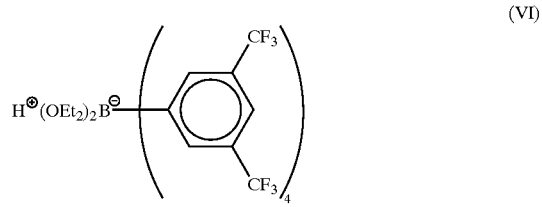

(VI)

wherein Et is an ethyl group, or the formula (VII):

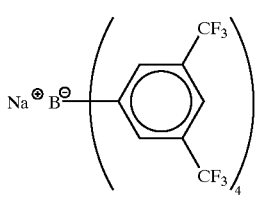

(VII)

Examples of the borane compounds include:

decaborane(14);

salts of anions, such as bis[tri(n-butyl)ammonium] nonaborate, bis[tri(n-butyl)ammonium]decaborate, bis[tri(n-butyl)ammonium]undecaborate, bis[tri(n-butyl)ammonium]dodecaborate, bis[tri(n-butyl)ammonium]decachlorodecaborate and bis[tri(n-butyl)ammonium]dodecachlorododecaborate; and salts of metallic borane anions, such as tri(n-butyl)ammoniumbis(dodecahydridododecaborate)cobaltate(III) and bis[tri(n-butyl)ammonium]bis(dodecahydridododecaborate)nickelate(III).

Examples of the carborane compounds include:

salts of anions, such as 4-carbanonaborane(14), 1,3-dicarbanonaborane(13), 6,9-dicarbadecaborane(14), dodecahydrido-1-phenyl-1,3-dicarbanonaborane, dodecahydrido-1-methyl-1,3-dicarbanonaborane, undecahydrido-1,3-dimethyl-1,3-dicarbanonaborane, 7,8-dicarbaundecaborane(13), 2,7-dicarbaundecaborane(13), undecahydrido-7,8-dimethyl-7,8-dicarbaundecaborane, dodecahydrido-11-methyl-2,7-dicarbaundecaborane, tri(n-butyl)ammonium-1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate, tri(n-butyl)ammoniumbromo-1-carbadodecaborate, tri(n-butyl)ammonium-6-carbadecaborate(14), tri(n-butyl)ammonium-6-carbadecaborate(12), tri(n-butyl)ammonium-7-carbaundecaborate(13), tri(n-butyl)ammonium-7,8-dicarbaundecaborate(12), tri(n-butyl)ammonium-2,9-dicarbaundecaborate(12), tri(n-butyl)ammoniumdodecahydrido-8-methyl-7,9-dicarbaundecaborate, tri(n-butyl)ammoniumundecahydrido-8-ethyl-7,9-dicarbaundecaborate, tri(n-butyl)ammoniumundecahydrido-8-butyl-7,9-dicarbaundecaborate, tri(n-butyl)ammoniumundecahydrido-8-allyl-7,9-dicarbaundecaborate, tri(n-butyl)ammoniumundecahydrido-9-trimethylsilyl-7,8-dicarbaundecaborate and tri(n-butyl)ammoniumundecahydrido-4,6-dibromo-7-carbaundecaborate; and salts of metallic carborane anions, such as tri(n-butyl)ammoniumbis(nonahydrido-1,3-dicarbanonaborate)cobaltate(III), tri(n-butyl)ammoniumbis(undecahydrido-7,8-dicarbaundecaborate)ferrate(III), tri(n-butyl)ammoniumbis(undecahydrido-7,8-dicarbaundecaborate)cobaltate(III), tri(n-butyl)ammoniumbis(undecahydrido-7,8-dicarbaundecaborate)nickelate(III), tri(n-butyl)ammoniumbis(undecahydrido-7,8-dicarbaundecaborate)cuprate(III), tri(n-butyl)ammoniumbis(undecahydrido-7,8-dicarbaundecaborate)aurate(III), tri(n-butyl)ammoniumbis(nonahydrido-7,8-dimethyl-7,8-dicarbaundecaborate)ferrate(III), tri(n-butyl)ammoniumbis(nonahydrido-7,8-dimethyl-7,8-dicarbaundecaborate)chromate(III), tri(n-butyl)ammoniumbis(tribromooctahydrido-7,8-dicarbaundecaborate)cobaltate(III), tris[tri(n-butyl)ammonium]bis(undecahydrido-7-carbaundecaborate)chromate(III), bis[tri(n-butyl)ammonium]bis(undecahydrido-7-carbaundecaborate)manganate(IV), bis[tri(n-butyl)ammonium]bis(undecahydrido-7-carbaundecaborate)cobaltate(III) and bis[tri(n-butyl)ammonium]bis(undecahydrido-7-carbaundecaborate)nickelate(IV).

The heteropoly compound comprises an atom of silicon, phosphorus, titanium, germanium, arsenic and tin and one or more atoms selected from vanadium, niobium, molybdenum and tungsten. Examples of such compounds include phosphovanadic acid, germanovanadic acid, arsenovanadic acid, phosphoniobic acid, germanoniobic acid, siliconomolybdic acid, phosphomolybdic acid, titanomolybdic acid, germanomolybdic acid, arsenomolybdic acid, stannomolybdic acid, phosphotungstic acid, germanotungstic acid, stannotungstic acid, phosphomolybdovanadic acid, phosphotungstovanadic acid, germanotaungstovanadic acid, phosphomolybdotungstovanadic acid, germanomolybdotungstovanadic acid, phosphomolybdotungstic acid, phosphomolybdoniobic acid, metallic salts of these acids, specifically, salts of these acids, for example with metals of Group 1 or 2 of the periodic table such as lithium, sodium, potassium, rubidium, cesium, beryllium, magnesium, calcium, strontium and barium, and organic salts of the above acids such as triphenylethyl salt, but not limited thereto.

The ionizing ionic compounds (B-3) mentioned above may be used singly or in combination of two or more kinds.

In the polymerization, any method of using and feeding and any order of feeding of the components can be selected, and, some examples are given below.

(1) The component (A) and at least one component selected from the organometallic compound (B-1), the organoaluminum oxy-compound (B-2) and the ionizing ionic compound (B-3) (simply referred to as "component (B)" hereinafter) are fed to the polymerization reactor in an arbitrary order.

(2) A catalyst component obtained by previously contacting the component (A) with the component (B-1), and the component (B-3) are fed to the polymerization reactor in an arbitrary order.

(3) A catalyst component obtained by previously contacting the component (A) with the component (B-1), the component (B-1) and the component (B-3) are fed to the polymerization reactor in an arbitrary order. In this case, the components (B-1) may be the same or different.

(4) A catalyst component obtained by previously contacting the component (A) with the component (B-1) and the component (B-3), and the component (B-1) are fed to the polymerization reactor in an arbitrary order. In this case, the components (B-1) may be the same or different.

(5) A catalyst obtained by previously contacting the component (A) with the component (B-2) is fed to the polymerization reactor.

(6) A catalyst component obtained by previously contacting the component (A) with the component (B-2), and the component (B-1) or the component (B-2) are fed to the polymerization reactor in an arbitrary order. In this case, the components (B-2) may be the same or different.

In the process for the ethylene/α-olefin copolymer according to the invention, ethylene and an α-olefin are copolymerized in a solution in the presence of the olefin polymerization catalyst described above to obtain an olefin copolymer.

In the present invention, the polymerization can be carried out as any of liquid phase polymerization, such as solution polymerization or suspension polymerization.

Examples of inert hydrocarbon media for use in the liquid phase polymerization include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures of these hydrocarbons. The olefin itself can be used as the solvent.

In the polymerization of an olefin using the olefin polymerization catalyst, the component (A) may be used in an amount of usually $10^{-12}$ to $10^{-2}$ mol/liter, preferably $10^{-10}$ to $10^{-3}$ mol/liter.

The component (B-1) may used in such an amount that the molar ratio of the component (B-1) to the transition metal atom (M) in the component (A) ((B-1)/(M)) becomes usually 0.01 to 100,000, preferably 0.05 to 50,000.

The component (B-2) may be used in such an amount that the molar ratio of the aluminum atom in the component (B-2) to the transition metal atom (M) in the component (A) ((B-2)/(M)) becomes usually 10 to 500,000, preferably 20 to 100,000.

The component (B-3) may be used in such an amount that the molar ratio of the component (B-3) to the transition metal atom (M) in the component (A) ((B-3)/(M)) becomes usually 1 to 10, preferably 1 to 5.

In the olefin polymerization using the olefin polymerization catalyst, the polymerization temperature may be in the range of usually −50 to 200° C., preferably 0 to 170° C. The polymerization pressure may be in the range of usually atmospheric pressure to 100 kg/cm$^2$, preferably atmospheric pressure to 50 kg/cm$^2$. The polymerization reaction can be carried out by any of batchwise, semi-continuous and continuous processes. The polymerization can also be conducted in two or more stages under different reaction conditions.

The molecular weight of the resulting ethylene/α-olefin copolymer can be regulated by changing the polymerization temperature. The molecular weight can also be regulated by changing the type of the component (B) used. And further, the molecular weight can be regulated by allowing hydrogen to be present in the polymerization system.

Modified Ethylene/α-olefin Copolymer

In the ethylene/α-olefin copolymer of the present invention, the proportion of the polymer chain having, an unsaturated bond at the molecular terminal is 95% or more, based on the total polymer chains, and this makes the copolymer easily be modified by graft reaction. Therefore, a variety of functional groups can be easily introduced at the terminal unsaturated (double) bond by oxidation, graft reaction or ene-synthesis reaction.

The modified ethylene/α-olefin copolymer of the present invention is obtained by modifying the terminal double bond of the ethylene/α-olefin copolymer by carboxyl group, acid anhydride group, ester group, epoxy group, hydroxyl group, diol group, amino group or phenyl group, or a molecular oxygen-containing gas and/or ozone-containing gas.

Specific examples of the modified ethylene/α-olefin copolymer will be described below:

(1) Modified Ethylene/α-olefin Copolymer Containing Carboxyl Group

The modified ethylene/α-olefin copolymer as the target compound can be obtained by the graft reaction on the ethylene/α-olefin copolymer of the present invention using a compound having carboxyl group and carbon-carbon double bond (e.g., maleic acid or methacrylic acid), in the presence of a graft reaction initiator, e.g., an organic peroxide.

(2) Modified Ethylene/α-olefin Copolymer Containing Acid Anhydride Group

The modified ethylene/α-olefin copolymer as the target compound can be obtained by the graft reaction on the ethylene/α-olefin copolymer of the present invention using a compound having acid anhydride group and carbon-carbon double bond (e.g., maleic anhydride or tetrahydrophthalic anhydride), in the presence of a graft reaction initiator, e.g., an organic peroxide.

The modified ethylene/α-olefin copolymer as the target compound can be also obtained by heating the ethylene/α-olefin copolymer of the present invention together with maleic anhydride at 100 to 200° C., to allow the ene-synthesis reaction to proceed and thereby to add the maleic anhydride to the double bond at the molecule terminal.

(3) Modified Ethylene/α-olefin Copolymer Containing Ester Group

The modified ethylene/α-olefin copolymer as the target compound can be obtained by the graft reaction on the ethylene/α-olefin copolymer of the present invention using a compound having ester group and carbon-carbon double bond (e.g., methacrylate, acrylate or maleate ester), in the presence of a graft reaction initiator, e.g., an organic peroxide.

The modified ethylene/α-olefin copolymer as the target compound can be also obtained by heating the ethylene/α-olefin copolymer of the present invention together with maleic anhydride at 100 to 200° C., to add the maleic anhydride to the double bond at the molecule terminal, and followed by reacting an alcohol thereon.

(4) Modified Ethylene/α-olefin Copolymer Containing Epoxy Group

The modified ethylene/α-olefin copolymer as the target compound can be obtained by the graft reaction on the ethylene/α-olefin copolymer of the present invention using a compound having an epoxy group and carbon-carbon double bond (e.g., glycidyl methacrylate), in the presence of a graft reaction initiator, e.g., an organic peroxide.

The modified ethylene/α-olefin copolymer as the target compound can be also obtained by reacting the ethylene/α-olefin copolymer of the present invention with a mixture composed of an organic acid (e.g., formic acid or acetic acid) and hydrogen peroxide water. It is preferable to use a buffer (e.g., sodium hydrogen phosphate, sodium carbonate or sodium hydrogen carbonate) for this reaction.

The modified ethylene/α-olefin copolymer as the target compound can be also obtained by reacting the ethylene/α-olefin copolymer of the present invention with an organic peroxide (e.g., acetic peracid or m-chloroperbenzoic acid).

(5) Modified Ethylene/α-olefin Copolymer Containing Hydroxyl Group

The modified ethylene/α-olefin copolymer as the target compound can be obtained by the graft reaction on the ethylene/α-olefin copolymer of the present invention using a compound having a hydroxyl group and carbon-carbon double bond (e.g., 2-hydroxyethyl methacrylate), in the presence of a graft reaction initiator, e.g., an organic peroxide.

The modified ethylene/α-olefin copolymer as the target compound can be also obtained by reacting the ethylene/α-olefin copolymer of the present invention with a boron compound (e.g., diborane or 9-borabicyclo[3,3,1]nonane) for the hydroboration reaction, and oxidizing the reaction product with hydrogen peroxide.

(6) Modified Ethylene/α-olefin Copolymer Containing Diol Group

The modified ethylene/α-olefin copolymer as the target compound can be obtained by hydrolyzing, e.g., the modified ethylene/α-olefin copolymer containing an epoxy group synthesized by such a method as described above.

The modified ethylene/α-olefin copolymer as the target compound can be also obtained by reacting the modified ethylene/α-olefin copolymer containing a maleic anhydride group synthesized by such a method as described above with diethanolamine.

(7) Modified Ethylene/α-olefin Copolymer Containing Amino Group

The modified ethylene/α-olefin copolymer as the target compound can be also obtained by reacting the modified ethylene/α-olefin copolymer containing an epoxy or maleic anhydride group synthesized by such a method as described above with an amine.

(8) Modified Ethylene/α-olefin Copolymer Containing Phenyl Group

The modified ethylene/α-olefin copolymer as the target compound can be obtained by the graft reaction on the ethylene/α-olefin copolymer of the present invention using a compound having phenyl group and carbon-carbon double bond (e.g., styrene), in the presence of a graft reaction initiator, e.g., an organic peroxide.

(9) Oxidation-modified Ethylene/α-olefin Copolymer

The modified ethylene/α-olefin copolymer as the target compound can be obtained by oxidizing the ethylene/α-olefin copolymer of the present invention with molecular oxygen-containing gas and/or ozone-containing gas.

Lubricant Oil Composition

The lubricant oil composition of the present invention contains a base oil and various additives, and contains 1 to 99% by weight of the above described ethylene/α-olefin copolymer as a base oil or viscosity index improver.

Examples of base oil include the above described ethylene/α-olefin copolymer having viscosity at 100° C. of less than 300 mm$^2$/s and preferably not more than 100 mm$^2$/s, generally refined mineral oil, highly refined mineral oil, and synthetic oil such as hydrocarbon type and ester type. These base oils are used singly or in combination of two or more.

Examples of viscosity index improver include the above described ethylene/α-olefin copolymer having viscosity at 100° C. of not less than 300 mm$^2$/s and preferably not less than 600 mm$^2$/s, polymethacrylate and olefin type polymers such as ethylene/α-olefin copolymer having higher molecular weight than that of the present invention, polybutadiene/styrene copolymer and polyisobutylene. The viscosity index improver is generally used in the range of 0 to 20% by weight. This lubricant oil composition is excellent in shear stability and low-temperature property.

And further, the lubricant oil composition of the present invention optionally contains various additives such as detergent-dispersant, pour point depressant, extreme pressure agent, antioxidant, anti-wear additive, preservative, anti-corrosive and anti-foaming agent.

Examples of the detergent-dispersant include the above described modified ethylene/α-olefin copolymer of the present invention, metal sulfonate, metal phenate, metal phosphanate and succinic acid imide. The detergent-dispersant is optionally used in the range of 0 to 15% by weight. Especially, the use of the modified ethylene/α-olefin copolymer is preferred in view of obtaining the lubricant oil composition having excellent shear stability, low-temperature property and ability of detergent-dispersant to suspend and disperse carbon sludges or the like.

Examples of the pour point depressant include polymethacrylate and condensate of paraffin wax with naphthalene or phenol. The pour point depressant is optionally used in the range of 0 to 3% by weight.

Examples of extreme pressure agent include sulfur, phosphorous and halides. The extreme pressure agent is optionally used in the range of 0 to 15% by weight.

Examples of antioxidant include phenols, amines, dithio-zinc-phosphate and organic sulfur compounds. The antioxidant is optionally used in the range of 0 to 3% by weight.

Examples of anti-wear additive include compounds such as molybdenum disulfide, organic molybdenum, graphite, aliphatic amine, amide and imide. The anti-wear additive is optionally used in the range of 0 to 3% by weight.

Examples of preservative and anti-corrosive include various kinds of amine compounds, metal carbonates, esters of polyhydric alcohol, phosphorous compounds and sulfonate. The preservative and/or anti-corrosive is optionally used in the range of 0 to 3% by weight.

Examples of anti-foaming agent include compound of silicone type, alcohol type, phosphate type, ester type and polyacrylate type. The anti-foaming agent is optionally used in the range of 0 to 0.2% by weight.

In addition to the above, additives such as demulsifier, colorant, oiliness agent (oiliness improver) may be incorporated into the lubricant oil composition of the present invention, if necessary.

Resin Composition

The resin composition of this present invention contains 100 parts by weight of base material 0.1 to 10 parts by weight of the above modified ethylene/α-olefin copolymer. Examples of the base material include an epoxy resin, an urethane resin, a polyacetal resin, a polyester resin and urea resin. These resin compositions have excellent slidability, decreased water absorption and improved vibration-damping properties, compared to conventional ones.

In addition to the above, additives such as antioxidant, heat-resistance agent, ultraviolet ray absorbent, flame retarder, antistatic agent, colorant, foaming agent, filler and reinforcing agent may be incorporated into the resin composition of the present invention, as far as not marring the objective of the present invention.

Effect of the Invention

The ethylene/α-olefin copolymer produced by the method of the present invention exhibits excellent shear stability and low-temperature characteristics as a lubricant base oil or viscosity index improver.

The method of the present invention gives a liquid ethylene/α-olefin copolymer excellent in polymerization activity and uniformity. It is also characterized by its ability of giving a liquid ethylene/α-olefin copolymer of low molecular weight even in the absence of hydrogen, with the result that it has unsaturated bond at the polymer molecular terminal at a ratio of at least 95%. The resultant high reactivity allows the copolymer to easily be modified with varying functional group(s) in high modification ratio.

EXAMPLE

The present invention will be described more concretely by Examples, which by no means limits the present invention.

The contents of ethylene, α-olefin and polymer chain having unsaturated bond at the molecular terminal in the ethylene/α-olefin copolymer were determined by the IR method, and the B value by the $^{13}$C-NMR method.

Number-average molecular weight (Mn) and molecular weight distribution (Mw/Mn) were determined by a GPC (Shimadzu's Chromatopack C-R4A) under the conditions of separation column: TSK G6000H XL, G4000H XL, G3000H XL or G2000H XL, column temperature: 40° C., mobile phase: tetrahydrofuran (Wako Jun-yaku), development speed: 0.7 mL/min, sample concentration: 0.2% by weight, and quantity of the sample injected: 200 µL. A differential refractometer was used as the detector, and polystyrene (Tosoh) was used as the reference.

Kinetic viscosity was measured at 100 and 40° C. in accordance with JIS K2283, and these values were used to determine viscosity index. Pour point was measured in accordance with JIS K2269. Low-temperature viscosity was measured as Brookfield viscosity at −20° C. in accordance with ASTM D2983. PAO-6 (Shin-Nittetsu Kagaku's Synfluid 601) was used as the lubricant composition base oil. Its viscosity index and KRL shear stability were measured at a composition of given viscosity. For the KRL shear stability test, the oil composition was subjected to shear conditions at 60° C. for 20 hours in the tester, and rate of kinetic viscosity loss, measured at 100° C. before and after the test was determined.

Example 1

Ethylene and propylene were fed at 150 and 450 L/h, respectively, into 1 L of toluene held in an autoclave of stainless steel (net volume: 2 L), which had been sufficiently purged with nitrogen beforehand, to saturate the liquid and vapor phases with the gas mixture. Then, 5 mmol (in terms of aluminum) of methyl aluminoxane and 0.02 mmol of the compound 1 shown by the following formula were added to the autoclave, to initiate the copolymerization. The copolymerization was conducted at 25° C. for 1 hour, and then, small quantity of isobutanol was added to terminate the polymerization.

The resultant polymer solution was treated with diluted hydrochloric acid for ash removal, and then extracted with toluene. The organic phase was concentrated under a vacuum, and dried at 130° C. for 10 hours also under a vacuum. As the result, 202 g of ethylene/propylene copolymer was obtained. Analysis results of the ethylene/propylene copolymer are given in Table 1.

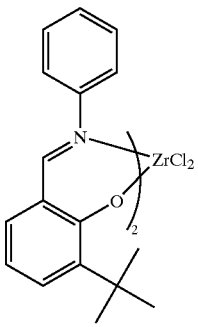

Compound 1

Example 2

The same copolymerization procedure as used for Example 1 was repeated, except that feeding rate of ethylene and propylene were varied to 60 and 540 L/h, respectively. As the result, 64.8 g of ethylene/propylene copolymer was obtained. Analysis results of the ethylene/propylene copolymer are given in Table 1.

Example 3

The same copolymerization procedure as in Example 1 was repeated, except that propylene was replaced by 1-butene, and ethylene and 1-butene were fed at 120 and 480 L/h, respectively. As the result, 45.6 g of ethylene/butene copolymer was obtained. Analysis results of the ethylene/butene copolymer are given in Table 1.

Comparative Example 1

The same copolymerization procedure as in Example 1 was repeated, except that Compound 1 was replaced by bis(cyclopentadienyl) zirconium dichloride and the copolymerization was conducted at 50° C. As the result, 18.2 g of ethylene/propylene copolymer was obtained. Analysis results of the ethylene/propylene copolymer are given in Table 1.

Comparative Example 2

To a 4-liter glass reactor equipped with a stirrer, hexane, a hexane solution of vanadyl trichloride (16 mmol/L) and hexane solution of ethyl aluminum sesqui-chloride (96 mmol/L) were continuously charged from the top of the reactor at 2, 1 (L/h) and 11 L/h, respectively, and the reaction liquid was continuously withdrawn from the reactor bottom in such a way to keep the reaction liquid in the reactor be 2 liter. A gas-mixture of ethylene, propylene and hydrogen each at 50, 48 and 202 L/h, respectively was charged from the reactor top, to initiate the copolymerization while controlling reaction temperature at 35° C. The copolymerization was conducted for 1 hour, and thereafter small quantity of methanol was added to the reaction liquid withdrawn from the bottom of the reactor to terminate the reaction. The resultant polymer solution was treated with diluted hydrochloric acid for ash removal, washed with water 3 times and then extracted with hexane. The organic phase was concentrated under a vacuum, and dried at 130° C. for 10 hours also under a vacuum. As the result 68.5 g of ethylene/propylene copolymer was obtained. Analysis results of the ethylene/propylene copolymer are given in Table 1.

TABLE 1

Properties of synthetic oils

|  | Comonomers | Content of ethylene (% by mol) | Content of polymer chains having unsaturated bond at the molecular terminal, based on the total polymer chains (%) | Polymerization activity (kg/mmol cat · h) | B value | Mn | Mw/Mn | Kinetic viscosity at 100° C. (mm²/s) | Viscosity index | Pour point (° C.) | Viscosity at −20° C. (mPa · s) |
|---|---|---|---|---|---|---|---|---|---|---|---|
| Ex. 1 | propylene | 70.8 | 95.8 | 10.1 | 1.1 | 1,370 | 1.49 | 20.2 | 160 | −50 | 11,500 |
| Ex. 2 | propylene | 50.1 | 98.1 | 3.2 | 1.1 | 1,100 | 1.47 | 15.0 | 155 | −55 | 8,000 |
| Ex. 3 | 1-butene | 62.5 | 99.2 | 2.3 | 1.1 | 1,150 | 1.53 | 20.0 | 160 | −55 | 11,000 |
| Comp. Ex. 1 | propylene | 50 | 50.5 | 0.9 | 1.2 | 1,400 | 1.61 | 23.0 | 155 | −47.5 | 16,000 |
| Comp. Ex. 2 | propylene | 47 | ≦0.1 | ≦0.01 | 1.2 | 1,340 | 1.60 | 19.8 | 150 | −47.5 | 15,000 |

Example 4

The same copolymerization procedure as in Example 2 was repeated, except that the copolymerization was conducted at 40° C. As the result, 88.8 g of ethylene/propylene copolymer having kinetic viscosity at 100° C. of 612 mm²/s was obtained. Analysis results of the ethylene/propylene copolymer and properties of the lubricant oil composition with the copolymer incorporated in the base oil are given in Table 2.

Example 5

The same copolymerization procedure as in Example 2 was repeated, except that the copolymerization was conducted at 50° C. As the result, 76.8 g of ethylene/propylene copolymer having kinetic viscosity at 100° C. of 2,130 mm²/s was obtained. Analysis results of the ethylene/propylene copolymer and properties of the lubricant oil composition with the copolymer incorporated in the base oil are given in Table 2.

Example 6

The same copolymerization procedure as in Example 5 was repeated, except that ethylene and propylene were fed at 120 and 480 L/h, respectively. As the result, 103 g of ethylene/propylene copolymer having kinetic viscosity at 100° C. of 3,824 mm²/s was obtained. Analysis results of the ethylene/propylene copolymer and properties of the lubricant oil composition with the copolymer incorporated in the base oil are given in Table 2.

Example 7

The same copolymerization procedure as in Example 3 was repeated, except that the copolymerization was conducted at 50° C. As the result, 38.4 g of ethylene/butene copolymer having kinetic viscosity at 100° C. of 1,992 mm²/s was obtained. Analysis results of the ethylene/butene copolymer and properties of the lubricant oil composition with the copolymer incorporated in the base oil are given in Table 2.

Comparative Example 3

The same copolymerization procedure as in Comparative Example 1 was repeated, except that the copolymerization was conducted at 5° C. As the result, 26.0 g of ethylene/propylene copolymer having kinetic viscosity at 100° C. of 2,010 mm²/s was obtained. Analysis results of the ethylene/propylene copolymer and properties of the lubricant oil composition with the copolymer incorporated in the base oil are given in Table 2.

Comparative Example 4

The same copolymerization procedure as in Comparative Example 2 was repeated, except that a gas mixture of ethylene (78 L/h), propylene (88 L/h) and hydrogen (35 L/h) was used. As the result, 153 g of ethylene/propylene copolymer having kinetic viscosity at 100° C. of 2,436 mm²/s was obtained. Analysis results of the ethylene/propylene copolymer and properties of the lubricant oil composition with the copolymer incorporated in the base oil are given in Table 2.

TABLE 2

Properties of copolymers and lubricant oil compositions

|  | Comonomers | Content of ethylene (% by mol) | Content of polymer chains having unsaturated bond at the molecular terminal, based on the total polymer chains (%) | Polymerization activity (kg/mmol cat · h) | B value | Mn | Mw/Mn | Content of the copolymer (%) | Kinetic viscosity at 100° C. (mm²/s) | Vis. index | KRL test results*[2] (Vis. loss %) |
|---|---|---|---|---|---|---|---|---|---|---|---|
| Ex. 4 | propylene | 53.0 | 97.6 | 4.4 | 1.1 | 5,200 | 1.68 | 16.2 | 13.80 | 165 | 5.0 |
| Ex. 5 | propylene | 53.6 | 99.0 | 3.8 | 1.1 | 8,100 | 1.72 | 10.2 | 13.79 | 170 | 8.9 |
| Ex. 6 | propylene | 57.8 | 99.5 | 5.1 | 1.1 | 11,500 | 1.75 | 9.3 | 13.87 | 176 | 10.2 |
| Ex. 7 | 1-butene | 63.0 | 99.4 | 1.9 | 1.1 | 7,300 | 1.71 | 9.9 | 13.81 | 176 | 9.4 |

Properties of lubricant oil compositions*[1]

TABLE 2-continued

Properties of copolymers and lubricant oil compositions

| | | Content of polymer chains | | | | | | Properties of lubricant oil compositions*[1] | | | |
|---|---|---|---|---|---|---|---|---|---|---|---|
| | Comonomers | Content of ethylene (% by mol) | having unsaturated bond at the molecular terminal, based on the total polymer chains (%) | Polymerization activity (kg/mmol cat · h) | B value | Mn | Mw/Mn | Content of the copolymer (%) | Kinetic viscosity at 100° C. (mm²/s) | Vis. index | KRL test results*[2] (Vis. loss %) |
| Comp. Ex. 3 | propylene | 52.0 | 56.2 | 1.3 | 1.1 | 7,700 | 1.83 | 10.7 | 13.87 | 168 | 14.2 |
| Comp. Ex. 4 | propylene | 55.3 | ≦0.1 | ≦0.01 | 1.2 | 8,500 | 1.80 | 9.2 | 13.72 | 174 | 15.5 |

*[1]Base oil PAO-6
*[2]Rate of kinetic viscosity loss, measured at 100° C. before and after the KRL shear stability test

Example 8

Ten (10) g of the ethylene/propylene copolymer prepared in Example 5 and 20 mL of o-dichlorobenzene were mixed and stirred in a glass reactor (net volume: 100 mL), and heated to 175° C. in an oil bath. Then, a solution of 0.9 g of 2-methyl-3-buten-2-ol and 0.18 g of di-tert-butyl peroxide (Nippon Oil and Fat's Perbutyl D) dissolved in 10 mL of o-dichlorobenzene was charged dropwise to the reactor from the top over a period of 5 hours, for the graft modification. The reactions were allowed to proceed for 1 hour after the dropping step was completed, and then the solvent and unreacted reactants were removed under a vacuum. The resulting reactant was then separated by column chromatography (stationary phase: Wakogel C-300, mobile phase: hexane and then THF). It was fond that hydroxyl group was bonded to 97% of the ethylene/propylene copolymer chain based on the total polymer chain.

Comparative Example 5

The same modification procedure as in Example 8 was repeated, except that the ethylene/propylene copolymer was replaced by the one prepared in Comparative Example 3. The modified reactant was separated by column chromatography. It was fond that hydroxyl group was bonded to 71% of the ethylene/propylene copolymer chain based on the total polymer chain.

What is claimed is:

1. A method of producing an ethylene/α-olefin copolymer comprising copolymerizing ethylene and an α-olefin having 3 to 10 carbon atoms in the presence of an olefin-polymerizing catalyst comprising:

(A) a transition metal compound, represented by the following formula II

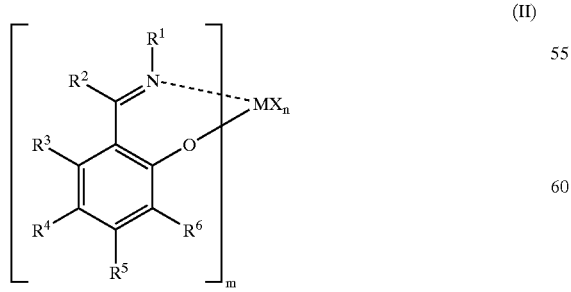

(II)

wherein M is a transition metal atom selected from Group 3 to 11 of the Periodic Table;

m is an integer of 1–6;

$R^1$ to $R^6$ may be the same or different from each other, and is a hydrogen atom, a halogen atom, a hydrocarbon group, a heterocyclic compound residue group, an oxygen-containing group, a nitrogen-containing group, a boron-containing group, a sulfur-containing group, a phosphorus-containing group, a silicon-containing group, a germanium-containing group or a tin-containing group, with the proviso that two or more of these may be bonded to each other to form a ring, and when m is 2 or more, any two of groups represented by $R^1$ to $R^6$ may be bonded;

n is a number satisfying a valence of M;

X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residual group, a silicon-containing group, a germanium-containing group or a tin-containing group, with the proviso that when n is 2 or more, plural groups represented by X may be the same as or different from each other, and plural groups represented by X may be bonded to each other to form a ring;

(B) at least one compound selected from the groups consisting of
   (B-1) an organometallic compound;
   (B-2) an organoaluminoxy compound;
   (B-3) a compound reacting with the transition metal compound (A) to form an ion pair, said copolymerization being conducted under copolymerization conditions and said ethylene and α-olefin being present in amounts effective to yield an ethylene/α-olefin copolymer comprised of 30 to 80% by mol of ethylene units and 20 to 70% by mol of α-olefin, said copolymer having a number-average molecular weight (Mn) of 500 to 12,000, determined by gel permeation chromatography (GPC) and molecular weight distribution (Mw/Mn) of 3 or less; having a kinetic viscosity at 100° C. of 10 to 5,000 mm²/s; with at least 95% of the polymer chains having at least one unsaturated bond at the molecular terminals thereof; and having a B value, given by the following formula (I) of 1.0 to 2.0:

$$B = P_{OE}/(2P_O \cdot P_E) \quad (I)$$

wherein $P_E$ is molar fraction of the ethylene unit in the copolymer, $P_O$ is molar fraction of the α-olefin unit in the copolymer, and $P_{OE}$ is the proportion of the number of α-olefin/ethylene sequences to the number of all the dyad sequences.

2. The method of producing ethylene/α-olefin copolymer according to claim 1, wherein hydrogen is not used as a molecular weight modifier.

3. A lubricant oil composition, characterized by comprising the ethylene/α-olefin copolymer obtained by the method according to any one of claims 1 and 2 as base oil or viscosity index improver.

4. A modified ethylene/α-olefin copolymer wherein the ethylene/α-olefin copolymer obtained by the method according to any one of claims 1 and 2 is modified by any one group selected from a carboxyl group, an acid anhydride group, an ester group, an epoxy group, a hydroxyl group, a diol group, an amino group and a phenyl group, or molecular oxygen-containing gas and/or ozone-containing gas.

5. A lubricant oil composition, characterized by comprising the modified ethylene/α-olefin copolymer according to claim 4 as detergent-dispersant.

6. A resin composition, characterized by comprising the modified ethylene/α-olefin copolymer according to claim 4 as a modifier which modifies a resin selected from the group consisting of an epoxy resin, an urethane resin, a polyacetal resin, a polyester resin and urea resin.

* * * * *